(12) United States Patent
Lim et al.

(10) Patent No.: US 11,961,203 B2
(45) Date of Patent: Apr. 16, 2024

(54) IMAGE PROCESSING DEVICE AND OPERATION METHOD THEREFOR

(71) Applicant: SAMSUNG ELECTRONICS CO., LTD., Suwon-si (KR)

(72) Inventors: Kyungmin Lim, Suwon-si (KR); Jaesung Lee, Suwon-si (KR); Tammy Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 611 days.

(21) Appl. No.: 17/264,656

(22) PCT Filed: Jul. 29, 2019

(86) PCT No.: PCT/KR2019/009400
§ 371 (c)(1),
(2) Date: Jan. 29, 2021

(87) PCT Pub. No.: WO2020/027519
PCT Pub. Date: Feb. 6, 2020

(65) Prior Publication Data
US 2021/0334578 A1    Oct. 28, 2021

(30) Foreign Application Priority Data
Aug. 2, 2018 (KR) .......... 10-2018-0090432

(51) Int. Cl.
*G06T 3/00* (2006.01)
*G06F 18/2413* (2023.01)
(Continued)

(52) U.S. Cl.
CPC .......... *G06T 3/00* (2013.01); *G06F 18/2413* (2023.01); *G06N 3/04* (2013.01); *G06N 3/08* (2013.01); *G06V 10/764* (2022.01); *G06V 10/82* (2022.01)

(58) Field of Classification Search
None
See application file for complete search history.

(56) References Cited

U.S. PATENT DOCUMENTS

| | | | |
|---|---|---|---|
| 2017/0132528 A1* | 5/2017 | Aslan | G06N 20/00 |
| 2018/0075581 A1 | 3/2018 | Shi et al. | |
| 2019/0279345 A1 | 9/2019 | Kim et al. | |

FOREIGN PATENT DOCUMENTS

| | | |
|---|---|---|
| JP | 6-231245 A | 8/1994 |
| KR | 10-2016-0003020 A | 1/2016 |

(Continued)

OTHER PUBLICATIONS

Communication dated Jul. 27, 2021, issued by the European Patent Office in counterpart European Application No. 19844841.7.

(Continued)

*Primary Examiner* — Leon Flores
(74) *Attorney, Agent, or Firm* — Sughrue Mion, PLLC

(57) ABSTRACT

An image processing device is disclosed. The image processing device includes: a memory storing one or more instructions; and a processor configured to execute the one or more instructions stored in the memory, wherein the processor is further configured to obtain a first image and a classifier that indicates a purpose of image processing, and to process, by using a deep neural network (DNN), the first image according to the purpose indicated by the classifier, wherein the DNN processes input images according to different purposes.

14 Claims, 18 Drawing Sheets

(51) Int. Cl.
*G06N 3/04* (2023.01)
*G06N 3/08* (2023.01)
*G06V 10/764* (2022.01)
*G06V 10/82* (2022.01)

(56) References Cited

FOREIGN PATENT DOCUMENTS

KR  10-2016-0096460 A  8/2016
KR  10-2018-0051367 A  5/2018

OTHER PUBLICATIONS

Huang et al., "Arbitrary Style Transfer in Real-time with Adaptive Instance Normalization," Cornell University Library, arXiv:1703.06868v1, Mar. 20, 2017, Total 11 pages, XP080758365.
Communication dated Nov. 6, 2019, issued by the International Searching Authority in counterpart International Application No. PCT/KR2019/009400 (PCT/ISA/210 and 237).
Dong et al., "Image Super-Resolution Using Deep Convolutional Networks," arXiv:1501.00092v1, Dec. 31, 2014, Total 14 pages.
Dahl et al., "Pixel Recursive Super Resolution," Computer Vision Foundation, ICCV paper, 2017, Total 10 pages.
Kim et al., "Convolutional Neural Network-Based Shadow Detection in Images Using Visible Light Camera Sensor," MDPI, Sensors, vol. 18, No. 960, 2018, Total 20 pages.
Office Action dated Feb. 15, 2023, issued by European Patent Office for European Application No. 19844841.7.

* cited by examiner

IMAGE PROCESSING DEVICE AND OPERATION METHOD THEREFOR

TECHNICAL FIELD

Various embodiments relate to an image processing device for processing an image by using a deep neural network, and an operating method thereof, and more particularly, to an image processing device for processing input images according to different purposes by using a single network, and an operating method thereof.

BACKGROUND ART

With the exponential increase in data traffic along with the development of computer technology, artificial intelligence (AI) has become a major trend driving future innovation. Because AI imitates how a human being thinks, it may be infinitely applied to substantially all industries. Representative technologies of AI may include pattern recognition, machine learning, expert systems, neural networks, natural language processing, and the like.

A neural network models characteristics of human biological neurons by using a mathematical expression and uses an algorithm which imitates the human ability referred to as learning. By using such an algorithm, the neural network may generate mapping between input data and output data, and an ability to generate the mapping may be represented as a learning ability of the neural network. In addition, the neural network has a generalization ability by which correct output data for input data, which has not been used for training, may be generated based on a trained result.

DESCRIPTION OF EMBODIMENTS

Technical Problem

Various embodiments may provide an image processing device capable of processing input images according to various purposes by using a single deep neural network and an operating method thereof.

Advantageous Effects of Disclosure

An image processing device according to an embodiment may process an image according to various purposes by using a single deep neural network.

An image processing device according to an embodiment may adjust an image processing level according to various purposes.

BEST MODE

Figure 1:
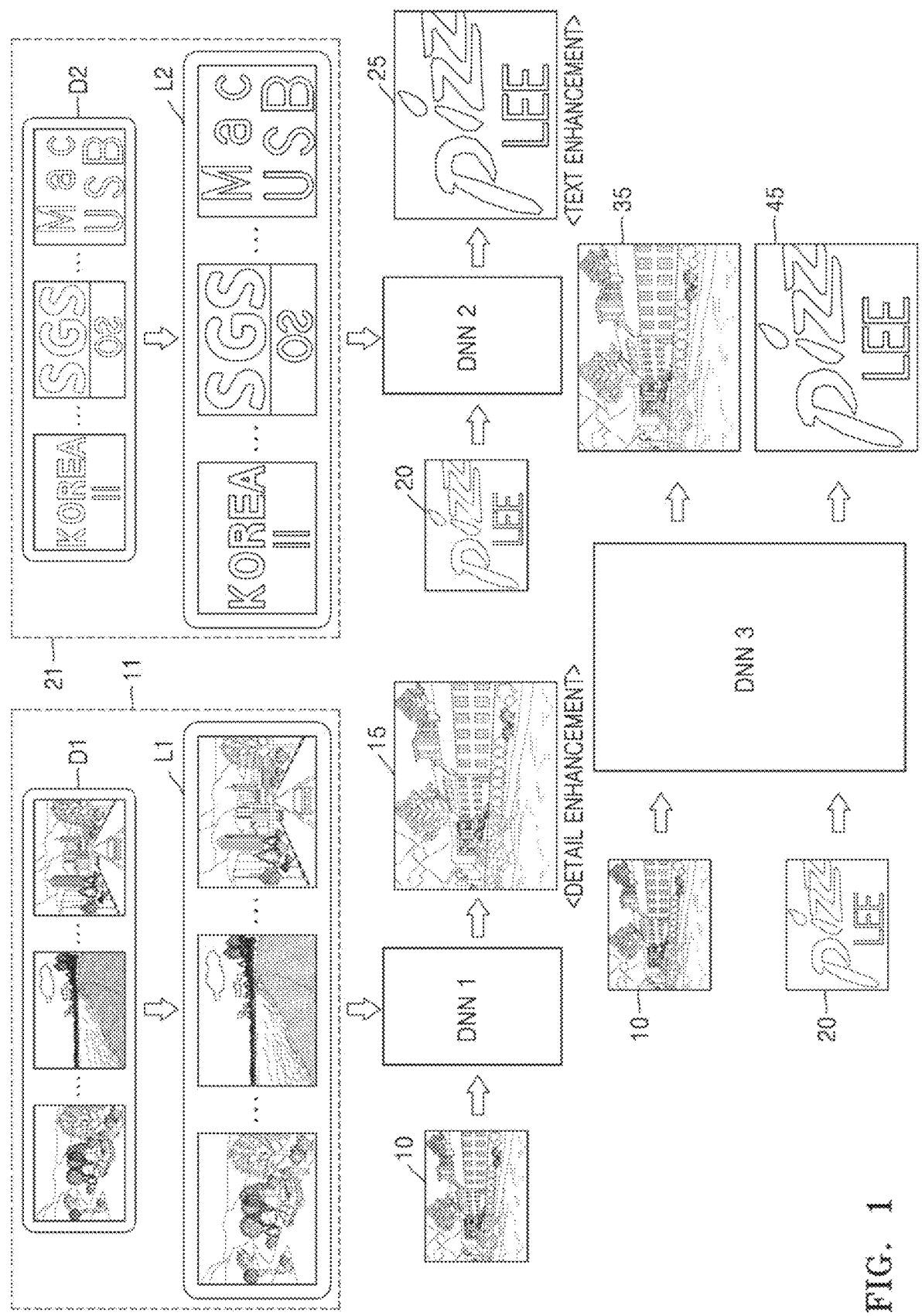
FIG. 1 illustrates a first deep neural network, a second deep neural network, and a third deep neural network trained using different training data sets.

According to an embodiment of the present disclosure, there is provided an image processing device including: a memory storing one or more instructions; and a processor configured to execute the one or more instructions stored in the memory, wherein the processor is further configured to obtain a first image and a classifier that indicates a purpose of image processing, and to process, by using a deep neural network (DNN), the first image according to the purpose indicated by the classifier, wherein the DNN processes input images according to different purposes.

The DNN may include N convolution layers, and the processor may be further configured to generate an input image based on the first image, extract feature information by performing a convolution operation in which one or more kernels are applied to the input image and the classifier in the N convolution layers, and generate a second image based on the extracted feature information.

The processor may be further configured to convert R, G, and B channels included in the first image into Y, U, and V channels of a YUV mode and determine, as the input image, an image of the Y channel among the Y, U, and V channels.

The processor may be further configured to generate the second image based on an image output by processing the image of the Y channel in the DNN and on images of the U and V channels among the Y, U, and V channels.

Pixels included in the classifier may have at least one of a first value and a second value that is greater than the first value, the first value may indicate a first purpose, and the second value may indicate a second purpose.

The processor may be further configured to process the first image according to the first purpose when all the pixels included in the classifier have the first value and to process the first image according to the second purpose when all the pixels included in the classifier have the second value.

When pixels in a first region included in the classifier have the first value, and pixels in a second region included in the classifier have the second value, a third region corresponding to the first region in the first image may be processed according to the first purpose, and a fourth region corresponding to the second region in the first image may be processed according to the second purpose.

The processor may be further configured to process the first image according to a level of image processing according to the first purpose and a level of image processing according to the second purpose, which are determined based on values of the pixels included in the classifier, the first value, and the second value.

The processor may be further configured to generate the classifier based on a characteristic of the first image.

The processor may be further configured to generate a map image indicating a text and an edge included in the first image and determine a value of pixels included in the classifier based on the map image.

The DNN may be trained by a first training data set including first image data, a first classifier having a first value as a pixel value, and first label data obtained by processing the first image data according to a first purpose, and by a second training data set including second image data, a second classifier having a second value as a pixel value, and second label data obtained by processing the second image data according to a second purpose.

The processor may be further configured to adjust weights of one or more kernels included in the DNN to decrease a difference between the first label data and image data output when the first image data and the first classifier are input to the DNN and adjust the weights of the one or more kernels included in the DNN to decrease a difference between the second label data and image data output when the second image data and the second classifier are input to the DNN.

According to another embodiment of the present disclosure, there is provided an operating method of an image processing device, the method including: obtaining a first image and a classifier that indicates a purpose of image processing; and processing the first image according to the purpose indicated by the classifier, by using a deep neural network (DNN), wherein the DNN processes a plurality of images according to different purposes.

According to another embodiment of the present disclosure, there is provided a computer program product including one or more computer-readable recording medium storing a program configured to perform: obtaining a first image and a classifier that indicates a purpose of image processing; and processing the first image according to the purpose indicated by the classifier, by using a deep neural network (DNN) configured to process a plurality of images according to different purposes.

Mode of Disclosure

The terms used in the specification will be schematically described, and then, the present invention will be described in detail.

The terms used in the present invention are those general terms currently widely used in the art, but the terms may vary according to the intention of those of ordinary skill in the art, precedents, or new technology in the art. Also, specified terms may be selected by the applicant, and in this case, the detailed meaning thereof will be described in the detailed description. Thus, the terms used in the present invention should be understood not as simple names but based on the meaning of the terms and the overall description.

Throughout the specification, it will also be understood that when a component "includes" an element, unless there is another opposite description thereto, it should be understood that the component does not exclude another element but may further include another element. In addition, terms such as " . . . unit", " . . . module", and the like refer to units that perform at least one function or operation, and the units may be implemented as hardware or software or as a combination of hardware and software.

Hereinafter, embodiments will be described in detail with reference to the accompanying drawings so that those of ordinary skill in the art to which the present invention belongs may easily realize the embodiments. However, the present invention may be embodied in many different forms and should not be construed as being limited to the embodiments set forth herein. In the drawings, parts irrelevant to the description are omitted to clearly describe the present invention, and like reference numerals denote like elements throughout the specification.

FIG. 1 illustrates a first deep neural network (DNN1), a second deep neural network (DNN2), and a third deep neural network (DNN3) trained using different training data sets.

Referring to FIG. 1, the DNN1 may be trained by a first training data set 11. Herein, the first training data set 11 may be a training data set for detail enhancement (e.g., a first purpose) of an image. For example, the first training data set 11 may include pieces of first image data D1 and pieces of first label data L1. The pieces of first label data L1 may be, as pieces of high-resolution image data corresponding to the pieces of first image data D1, pieces of image data obtained by enhancing texture representation when the pieces of first image data D1 are converted into high-resolution images.

The DNN2 may be trained by a second training data set 21. Herein, the second training data set 21 may be a training data set for enhancement of a text or an edge included in an image (a second purpose). For example, the second training data set 21 may include pieces of second image data D2 and pieces of second label data L2. The pieces of second label data L2 may be, as pieces of high-resolution image data corresponding to the pieces of second image data D2, pieces of image data obtained by reducing jagging or the like appearing around a text or an edge (enhancing text or edge representation) when the pieces of second image data D2 are converted into high-resolution images.

In addition, the DNN3 may be trained by the first training data set 11 and the second training data set 21.

As shown in FIG. 1, when a first image 10 is input to the DNN1, the DNN1 may output a first output image 15, and the first output image 15 may be a high-resolution image obtained by enhancing texture representation of the first image 10. In addition, when a second image 20 is input to the DNN2, the DNN2 may output a second output image 25, and the second output image 25 may be a high-resolution image obtained by enhancing text or edge representation of the second image 20.

Meanwhile, when the first image 10 is input to the DNN3, the DNN3 may output a third output image 35, and in this case, a degree of detail enhancement (texture representation enhancement) of the third output image 35 is less than that of the first output image 15. In addition, when the second image 20 is input to the DNN3, the DNN3 may output a fourth output image 45, and in this case, a degree of text or edge representation enhancement of the fourth output image 45 is less than that of the second output image 25.

The DNN3 trained by both the first training data set 11 for training of the first purpose (detail enhancement) and the second training data set 21 for training of the second purpose (text or edge enhancement) does not have the performance of the DNN1 trained by the first training data set 11 and the performance of the DNN2 trained by the second training data set 21.

Figure 2:
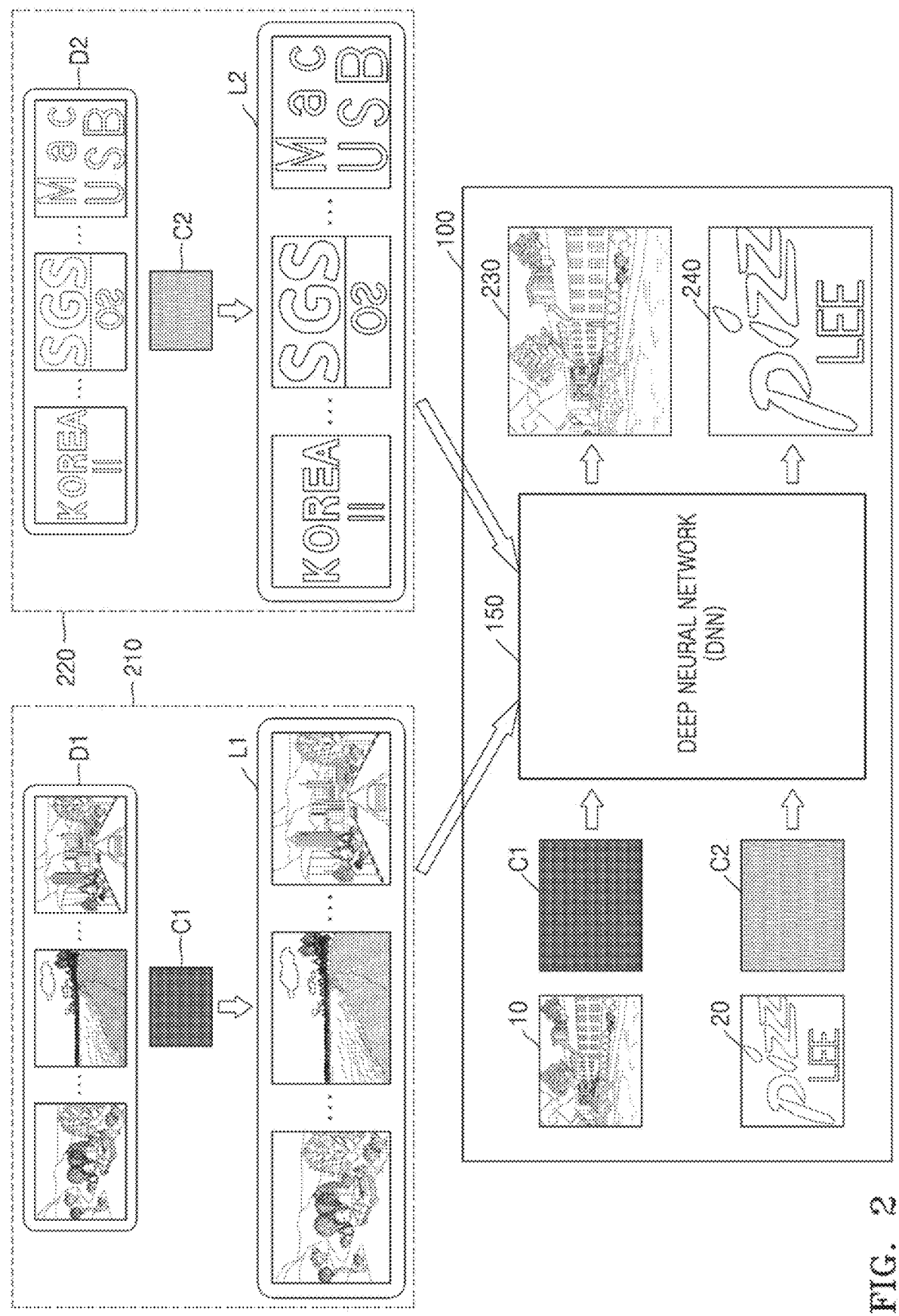
FIG. 2 illustrates a process, performed by an image processing device, of processing input images according to different purposes, according to an embodiment.

FIG. 2 illustrates a process, performed by an image processing device, of processing input images according to different purposes, according to an embodiment.

An image processing device 100 according to an embodiment may process input images by using a deep neural network (DNN) 150. The DNN 150 according to an embodiment may be trained by a first training data set 210 for training of the first purpose (e.g., detail enhancement) and a second training data set 220 for training of the second purpose (e.g., text or edge enhancement). Herein, the first training data set 210 may include the pieces of first image data D1, a first classifier C1 indicating the first purpose, and the pieces of first label data L1. The pieces of first image data D1 and the pieces of first label data L1 are the same as the pieces of first image data D1 and the pieces of first label data L1 described with reference to FIG. 1. The DNN 150 may be trained to output the pieces of first label data L1 when the pieces of first image data D1 and the first classifier C1 are input. In addition, the second training data set 220 may include the pieces of second image data D2, a second classifier C2 indicating the second purpose, and the pieces of second label data L2. The pieces of second image data D2 and the pieces of second label data L2 are the same as the pieces of second image data D2 and the pieces of second label data L2 described with reference to FIG. 1. The DNN 150 may be trained to output the pieces of second label data L2 when the pieces of second image data D2 and the second classifier C2 are input.

The image processing device 100 according to an embodiment may input the first image 10 and the first classifier C1 indicating the first purpose (detail enhancement) to the DNN 150, and the DNN 150 may output a first output image 230 by processing the first image 10 according to the first purpose (e.g., detail enhancement) indicated by the first classifier C1. Herein, a degree of detail enhancement in the first output image 230 may be the same as or similar to that of the first output image 15 of the DNN1 described with reference to FIG. 1.

In addition, the image processing device 100 may input the second image 20 and the second classifier C2 indicating the second purpose (e.g., text or edge enhancement) to the DNN 150, and the DNN 150 may output a second output image 240 by processing the second image 20 according to the second purpose (e.g., text or edge enhancement) indicated by the second classifier C2. Herein, a degree of text or edge enhancement in the second output image 240 may be the same as or similar to that of the second output image 25 of the DNN2 described with reference to FIG. 1.

The image processing device 100 according to an embodiment may process a plurality of images according to different purposes by using a single DNN trained by image data, a classifier that indicates a processing purpose of the image data, and label data corresponding to the image data.

Figure 3:
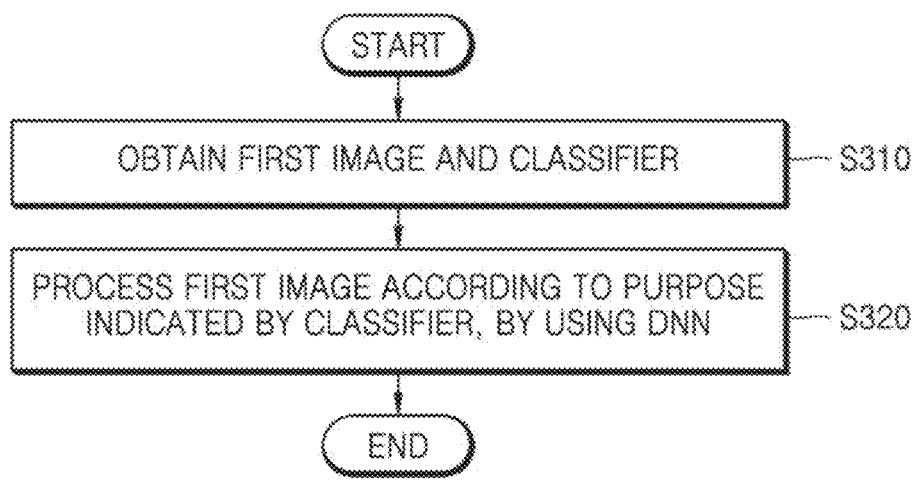
FIG. 3 is a flowchart of an operating method of an image processing device, according to an embodiment.

FIG. 3 is a flowchart of an operating method of an image processing device, according to an embodiment.

Referring to FIG. 3, in operation S310, the image processing device 100 according to an embodiment may obtain a first image and a classifier that indicates a purpose of image processing.

The image processing device 100 may generate an input image and a classifier to be input to a DNN, based on the first image. For example, the image processing device 100 may convert R, G, and B channels included in the first image into Y, U, and V channels through a color space conversion and determine, as the input image, an image of the Y channel among the Y, U, and V channels. The image processing device 100 may determine a pixel value of the classifier as a first value corresponding to the first purpose when attempting to perform image processing on the first image according to the first purpose and determine the pixel value of the classifier as a second value corresponding to the second purpose when attempting to perform image processing on the first image according to the second purpose. Alternatively, the image processing device 100 may extract an edge and a text from the first image and generate the classifier based on the extracted edge and text.

In operation S320, the image processing device 100 according to an embodiment may process the first image according to a purpose indicated by the classifier, by using a DNN.

The DNN may include N convolution layers, and the image processing device 100 may extract feature information (a feature map) by performing a convolution operation in which one or more kernels are applied to the input image and an identification image in each of the N convolution layers, and process the first image according to the purpose indicated by the classifier, based on the extracted feature information.

The image processing device 100 may determine an image processing level according to the first purpose and an image processing level according to the second purpose based on a value of pixels included in the classifier, the first value corresponding to the first purpose, and the second value corresponding to the second purpose and process the first image according to the determined level.

Meanwhile, the image processing device 100 may train the DNN by using a plurality of training data sets having different purposes. For example, the image processing device 100 may train the DNN by using a first training data set including pieces of first image data, a first classifier, and pieces of first label data obtained by processing the pieces of first image data according to the first purpose and a second training data set including pieces of second image data, a second classifier, and pieces of second label data obtained by processing the pieces of second image data according to the second purpose.

The image processing device 100 may adjust weights of one or more kernels included in the DNN to decrease differences between the pieces of first label data and pieces of image data output when the pieces of first image data and the first classifier are input to the DNN. In addition, the image processing device 100 may adjust the weights of the one or more kernels included in the DNN to decrease differences between the pieces of second label data and pieces of image data output when the pieces of second image data and the second classifier are input to the DNN.

Figure 4:
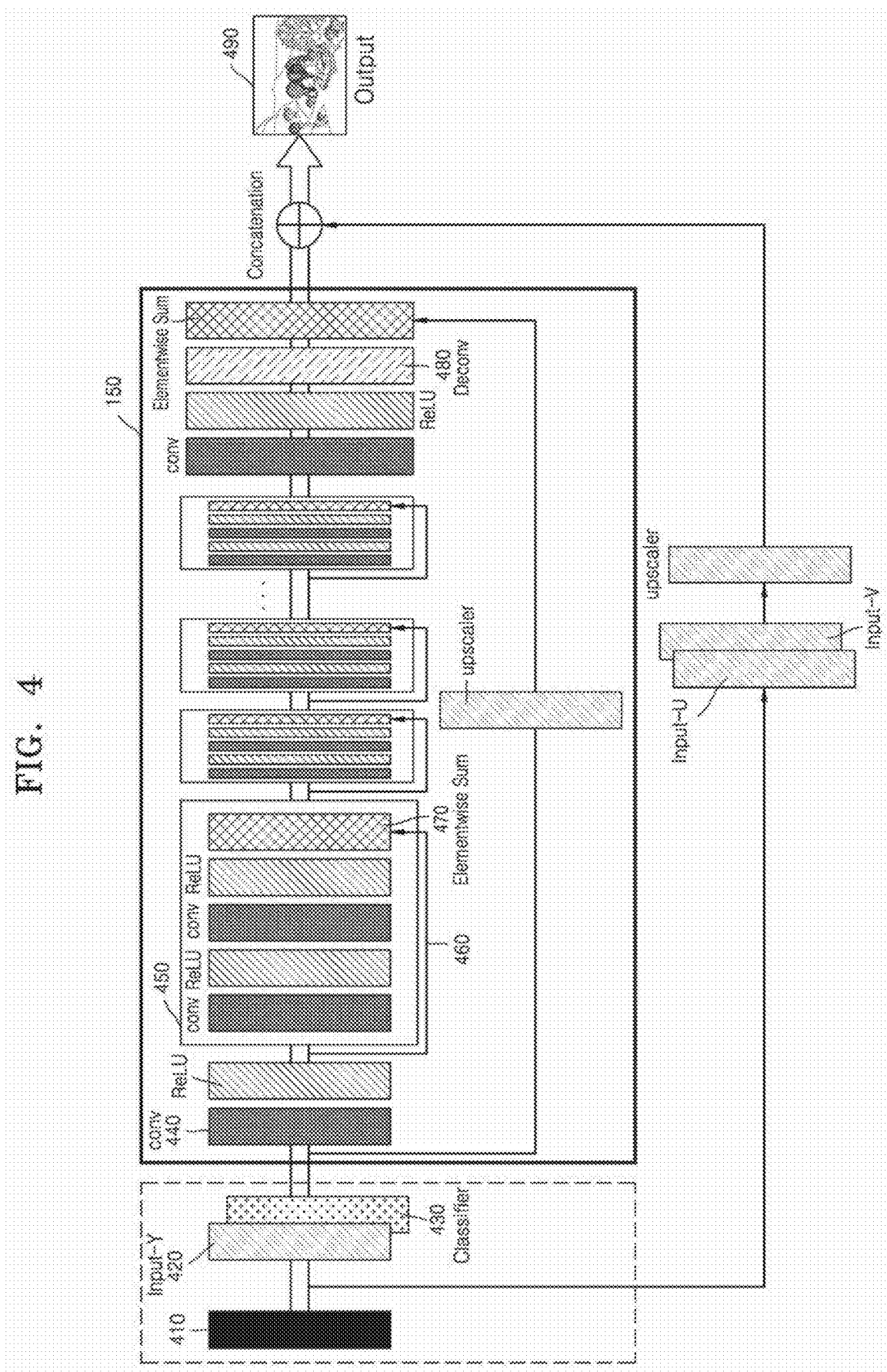
FIG. 4 is a reference diagram for describing a method, performed by an image processing device, of processing an image, according to an embodiment.

FIG. 4 is a reference diagram for describing a method, performed by an image processing device, of processing an image, according to an embodiment.

Referring to FIG. 4, the image processing device 100 according to an embodiment may receive a first image 410. The image processing device 100 may input the first image 410 to the DNN 150 or generate, based on the first image 410, an input image 420 to be input to the DNN 150. In addition, the image processing device 100 according to an embodiment may generate a classifier 430 indicating a purpose of image processing on the first image 410. A method of generating the input image 420 and the classifier 430 will be described in detail with reference to FIG. 5.

Figure 5:
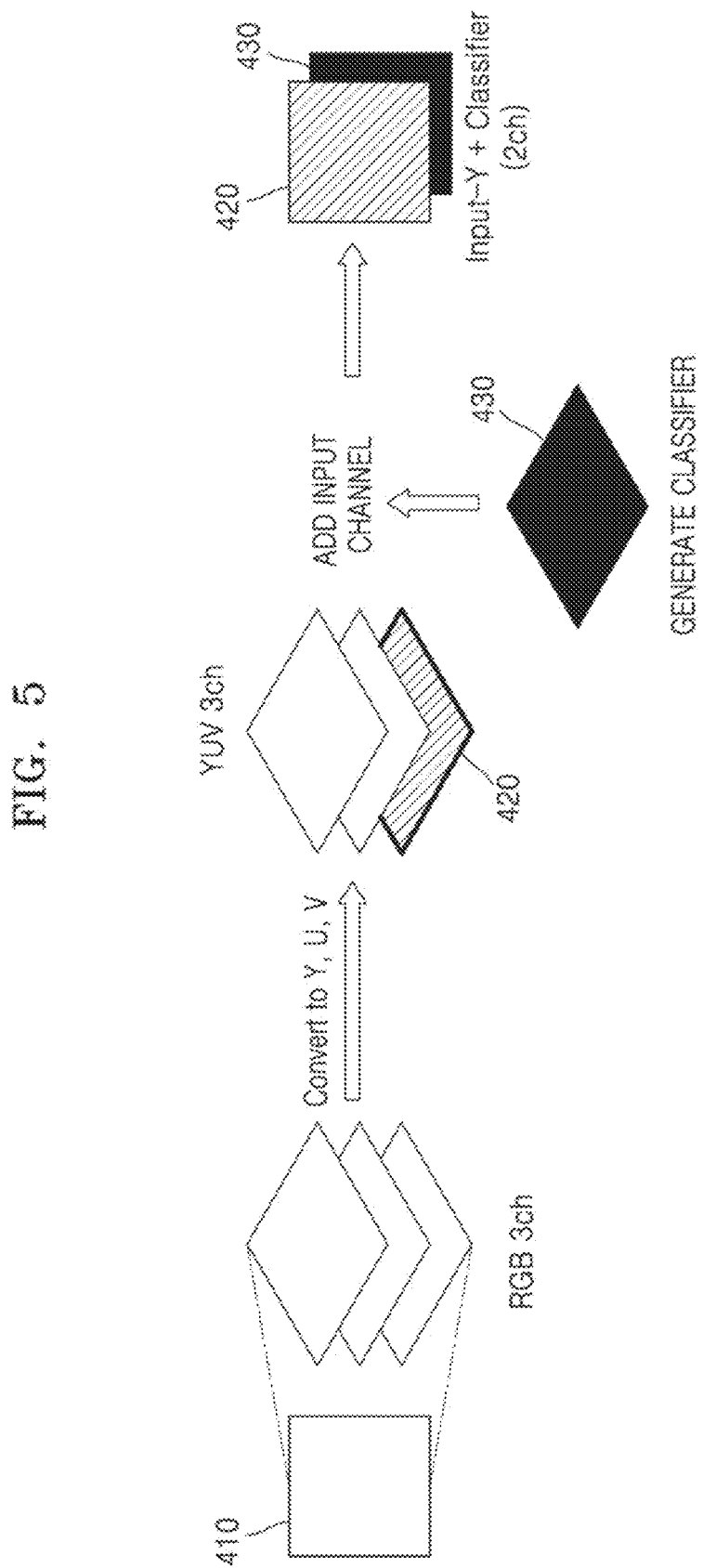
FIG. 5 is a reference diagram for describing a method, performed by an image processing device, of generating an input image and a classifier, according to an embodiment.

FIG. 5 is a reference diagram for describing a method, performed by an image processing device, of generating an input image and a classifier, according to an embodiment.

Referring to FIG. 5, the first image 410 may include R, G, and B channels (RGB 3ch). The image processing device 100 according to an embodiment may determine the R, G, and B channels (RGB 3ch) included in the first image 410 as an input image to be input to the DNN 150.

Alternatively, the image processing device 100 may convert the R, G, and B channels (RGB 3ch) included in the first image 410 into Y, U, and V channels (YUV 3ch) through a color space conversion. Herein, the Y channel 420 indicates a brightness signal, the U channel indicates a difference between the brightness signal and a blue component, and the V channel indicates a difference between the brightness signal and a red component. The image processing device 100 may determine an image of the Y channel 420 among the converted Y, U, and V channels (YUV 3ch) as an input image to be input to the DNN 150. However, the present embodiment is not limited thereto.

In addition, the image processing device 100 according to an embodiment may generate the classifier 430 indicating a purpose of image processing. Herein, the classifier 430 may have one pixel value or have a different pixel value for each region. In addition, the pixel values of the classifier 430 may be determined based on a user input or an image to be processed (e.g., the first image 410).

For example, when attempting to perform image processing on the entire first image 410 according to the first purpose, the image processing device 100 may generate the classifier 430 so that all the pixels of the classifier 430 have the first value corresponding to the first purpose. Alternatively, when attempting to perform image processing on the entire first image 410 according to the second purpose, the image processing device 100 may generate the classifier 430 so that all the pixels of the classifier 430 have the second value corresponding to the second purpose.

Alternatively, the image processing device 100 may generate the classifier 430 based on the first image 410. For example, the image processing device 100 may determine whether the first image 410 is supposed to be processed according to the first purpose or the second purpose, through an image analysis on the first image 410. When texture is mainly included in the first image 410, the image processing device 100 may determine that the first image 410 is supposed to be processed according to the first purpose, and when a text or edge is mainly included in the first image 410, the image processing device 100 may determine that the first image 410 is supposed to be processed according to the second purpose. In addition, the image processing device 100 may determine whether a corresponding region is supposed to be processed according to the first purpose or the second purpose for each region included in the first image 410. Accordingly, when the first image 410 or a partial region (a first region) of the first image 410 is supposed to be processed according to the first purpose, the image processing device 100 may generate the classifier 430 so that pixels included in the entire region or the partial region (a region corresponding to the first region) of the classifier 430 have the first value. Alternatively, when the first image 410 or a partial region (a second region) of the first image 410 is supposed to be processed according to the second purpose, the image processing device 100 may generate the classifier 430 so that pixels included in the entire region or the partial region (a region corresponding to the second region) of the classifier 430 have the second value. This will be described in detail with reference to FIGS. 11 and 12.

The image processing device 100 may add the generated classifier 430 as an input channel to be input to the DNN 150. Accordingly, the input image 420 and the classifier 430 may be input to the DNN 150.

Referring back to FIG. 4, the image processing device 100 may process, by using the DNN (150?), the input image 420 according to the purpose indicated by the classifier 430 and output the processed image.

For example, the DNN 150 may include N convolution layers (two or more convolution layers). The DNN 150 has a structure in which input data (e.g., the input image 420 and the classifier 430) is input and passes through the N convolution layers to output data. In addition, in the DNN 150, other processing operations besides a convolution operation performed by applying one or more kernels to a feature map (feature information) may be performed, and these processing operations may be performed between convolution layers. For example, operations of an activation function, pooling, and the like may be performed.

The image processing device 100 according to an embodiment may extract "features" such as an outline, a line, and a color from the input image 420 by using the DNN 150. Each of the N convolution layers included in the DNN 150 may receive data, process the received data, and generate output data. For example, the image processing device 100 performs a convolution operation by applying one or more kernels or filters to an image (e.g., the input image 420 and the classifier 430) input to a first convolution layer 440 and extracts a first feature map (first feature information) as a convolution operation result. This will be described in detail with reference to FIGS. 6 and 7.

In addition, the image processing device 100 may apply an activation function to change values of the extracted first feature map to a nonlinear value indicating that a feature is "present or absent". In this case, a ReLu function may be used, but the present embodiment is not limited thereto. In addition, the image processing device 100 may perform sub-sampling (pooling) to reduce a size of an extracted feature map, and in this case, max pooling, average pooling, L2-norm pooling, or the like may be used, but the present embodiment is not limited thereto.

Referring to FIG. 4, the DNN 150 may include M residual blocks. A residual block 450 may include one or more convolution layers, and the image processing device 100 may perform an operation (an elementwise sum) 470 of element-wisely summing data 460 (e.g., the first feature map to which the ReLu function has been applied) skipping the convolution layers included in the residual block 450 and data (e.g., a third feature map which was extracted from a third convolution layer and to which the ReLu function has been applied) having passed through the convolution layers included in the residual block 450.

In addition, the DNN 150 may include a deconvolution layer 480. Herein, a size of feature information extracted from the deconvolution layer 480 may be greater than a size of feature information input to the deconvolution layer 480.

In addition, the image processing device 100 may upscale data input to the DNN 150. Herein, the image processing device 100 may upscale the input data by applying at least one of a bilinear interpolation method, a bicubic interpolation method, and a convolution interpolation method to the data input to the DNN 150. The image processing device 100 may generate output data by performing an operation (an elementwise sum) of element-wisely summing upscaled image data and the feature information extracted from the deconvolution layer 480. However, the present embodiment is not limited thereto.

In addition, the image processing device 100 may upscale images of the U and V channels among the Y, U, and V channels (YUV 3*ch*). Herein, the image processing device 100 may upscale the images of the U and V channels by applying at least one of the bilinear interpolation method, the bicubic interpolation method, and the convolution interpolation method to the images of the U and V channels. A second image 490 may be generated by concatenating the upscaled pieces of image data and the output data. In this case, the second image 490 may be obtained by processing the first image 410 according to the purpose indicated by the classifier 430.

Figure 6:
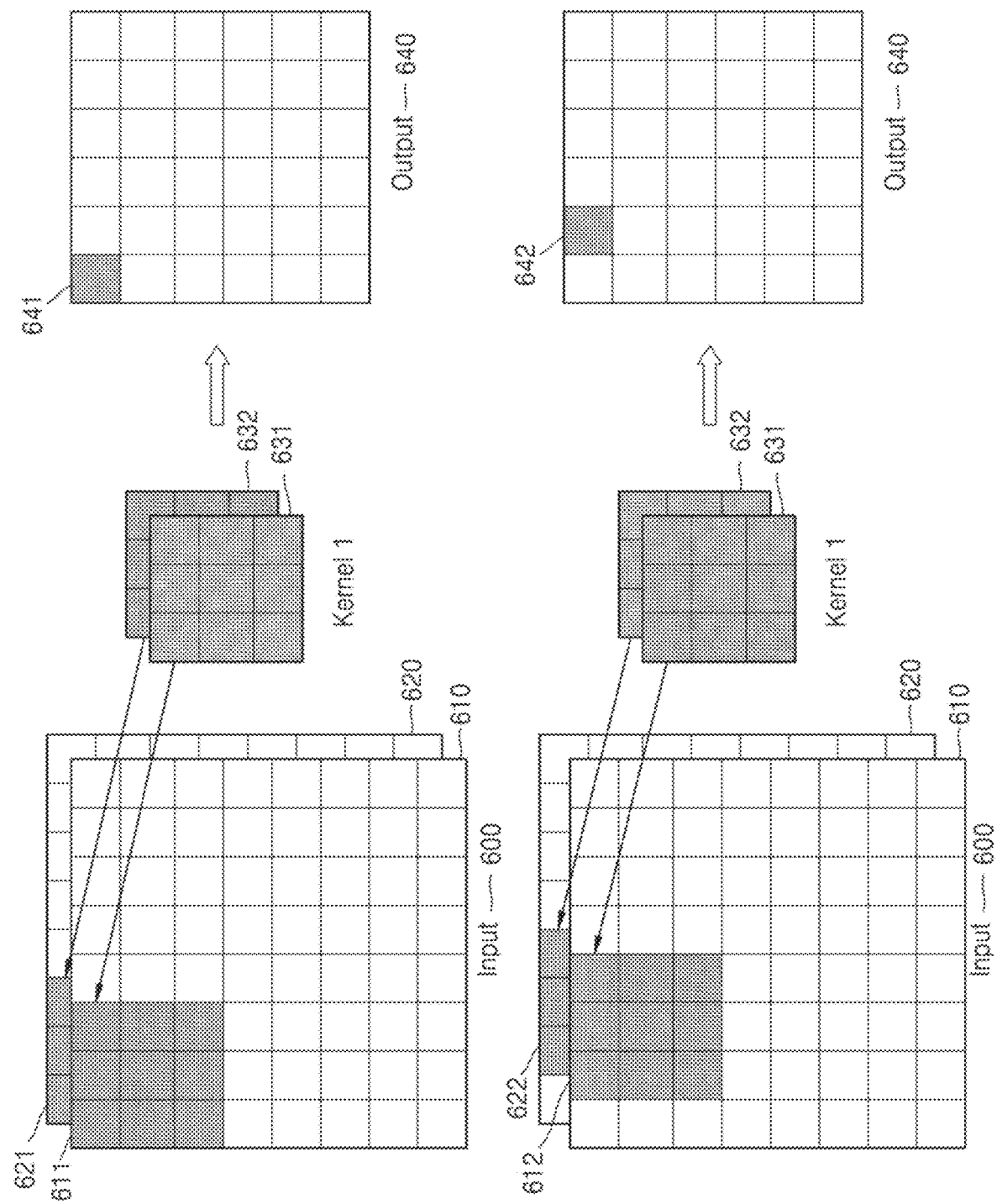
FIG. 6 is a reference diagram for describing a process, performed by a first convolution layer of FIG. 4, of processing a convolution operation.

FIG. 6 is a reference diagram for describing a process, performed by the first convolution layer 440 of FIG. 4, of processing a convolution operation.

Referring to FIG. 6, it is assumed that input data 600 of the first convolution layer 440 has an 8*8 size and the number of channels is 2 (e.g., an input image 610 and a classifier 620). In addition, it is assumed that a size of a kernel applied to the input data 600 is 3*3*2 (horizontal*vertical*depth) and the number of kernels is n. Herein, the depth of the kernel has the same value as the number of channels of the input data 600. It may be considered that one kernel includes two sub-kernels each having a 3*3 size, and the two sub-kernels may correspond to the two channels (the input image 610 and the classifier 620) of the input data 600, respectively.

Referring to FIG. 6, a process of extracting a feature of the input data 600 by applying sub-kernels 631 and 632 included in a first kernel Kernel1 to a left upper end to a right lower end of the input data 600 is shown. For example, a convolution operation may be performed by applying the first kernel Kernel1 to pixels included in 3*3*2 regions 611 and 621 at the left upper end of the input data 600. That is, a pixel value 641 mapped to the 3*3*2 regions 611 and 621 at the left upper end may be generated by multiplying pixel values included in the 3*3*2 regions 611 and 621 at the left upper end by weights included in the first kernel Kernel1, respectively, and summing the multiplication results.

In addition, a pixel value 642 mapped to 3*3*2 regions 612 and 622 respectively shifted by one pixel from the 3*3*2 regions 611 and 621 at the left upper end of the input data 600 may be generated by multiplying pixel values included in the 3*3*2 regions 612 and 622 by the weights included in the first kernel Kernel1, respectively, and summing the multiplication results.

In the same manner, pixel values may be generated by performing multiplication and addition of the weights included in the first kernel Kernel1 while scanning regions for a convolution operation pixel by pixel from the left to the right and from the top to the bottom within the input data 600. Accordingly, a 6*6 feature map (output data) 640 may be output. In this case, data for a convolution operation may be scanned while shifting pixel by pixel but may be scanned while shifting by every two or more pixels. The number of pixels by which input data is shifted in a scan process is referred to as a stride, and a size of a feature map to be output may be determined according to a size of the stride.

Referring to FIG. 6, the input data 600 has a size of 8*8, but the output data 640 has a size of 6*6 which is less than the size of the input data 600. A DNN includes a plurality of convolution layers, and a size of data keeps decreasing while passing through the plurality of convolution layers. In this case, when the size of the data decreases before a feature is sufficiently extracted, a feature of input data may be lost, and to prevent this problem, padding may be performed. Padding indicates increasing a size of input data by giving a certain value (e.g., '0') to an edge of the input data to prevent output data from decreasing. However, the present embodiment is not limited thereto.

Although FIG. 6 shows only a convolution operation result for the first kernel Kernel1, when a convolution operation for n kernels is performed, n feature maps may be output. That is, the number of channels of output data is determined according to the number (n) of kernels, and accordingly, the number of channels of input data in a next layer may also be determined.

Figure 7:
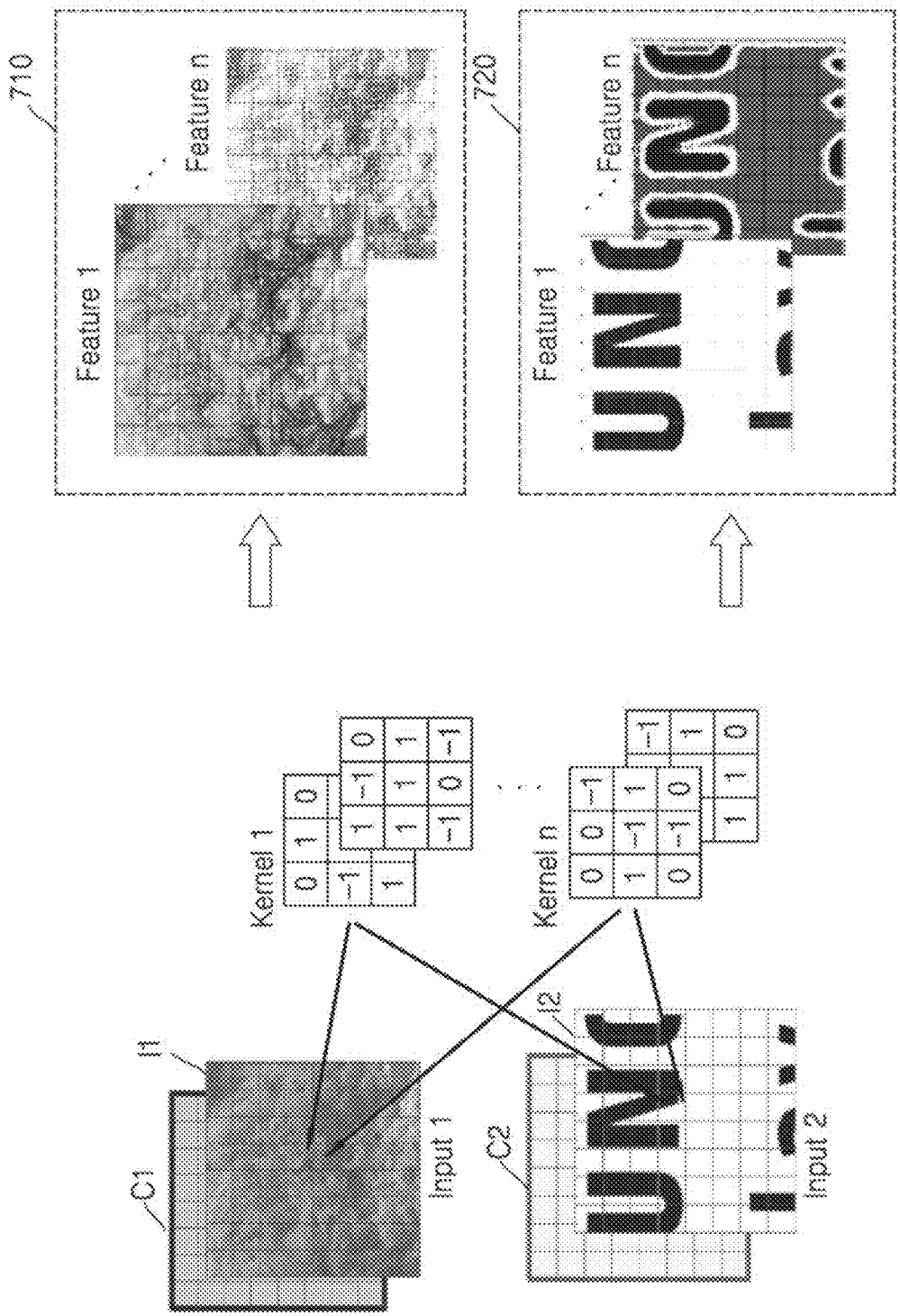
FIG. 7 illustrates input data and output data of a first convolution layer of FIG. 4, according to an embodiment.

FIG. 7 illustrates input data and output data of the first convolution layer 440 of FIG. 4, according to an embodiment.

Referring to FIG. 7, the image processing device 100 may input first input data Input1 to the first convolution layer 440. Herein, the first input data Input1 may include two channels including a first input image I1 and a first classifier C1. Herein, the first input image I1 may be, as an image mainly including texture, an image supposed to be processed so as to enhance texture representation when the image is converted into a high-resolution image. In addition, a pixel value of the first classifier C1 may be the first value indicating the first purpose (e.g., detail enhancement of an image). When the first input image I1 and the first classifier C1 are input, the first convolution layer 440 may perform a convolution operation by applying n kernels to the first input image I1 and the first classifier C1 as described with reference to FIG. 6. As a result of the convolution operation, n first feature maps 710 may be extracted as shown in FIG. 7.

In addition, the image processing device 100 may input second input data Input2 to the first convolution layer 440. Herein, the second input data Input2 may include two channels including a second input image I2 and a second classifier C2. Herein, the second input image I2 may be, as an image mainly including a text or an edge, an image supposed to be processed so as to enhance text or edge representation when the image is converted into a high-resolution image. In addition, a pixel value of the second classifier C2 may be the second value indicating the second purpose (e.g., text or edge enhancement).

When the second input image I2 and the second classifier C2 are input, the first convolution layer 440 may perform a convolution operation by applying n kernels to the second input image I2 and the second classifier C2 as described with reference to FIG. 6. As a result of the convolution operation, n second feature maps 720 may be extracted as shown in FIG. 7.

When the first feature maps 710 and the second feature maps 720 of FIG. 7 are compared to each other, texture features are better represented in the first feature maps 710 than the second feature maps 720, and text or edge features are better represented in the second feature maps 720 than the first feature maps 710.

Figure 8:
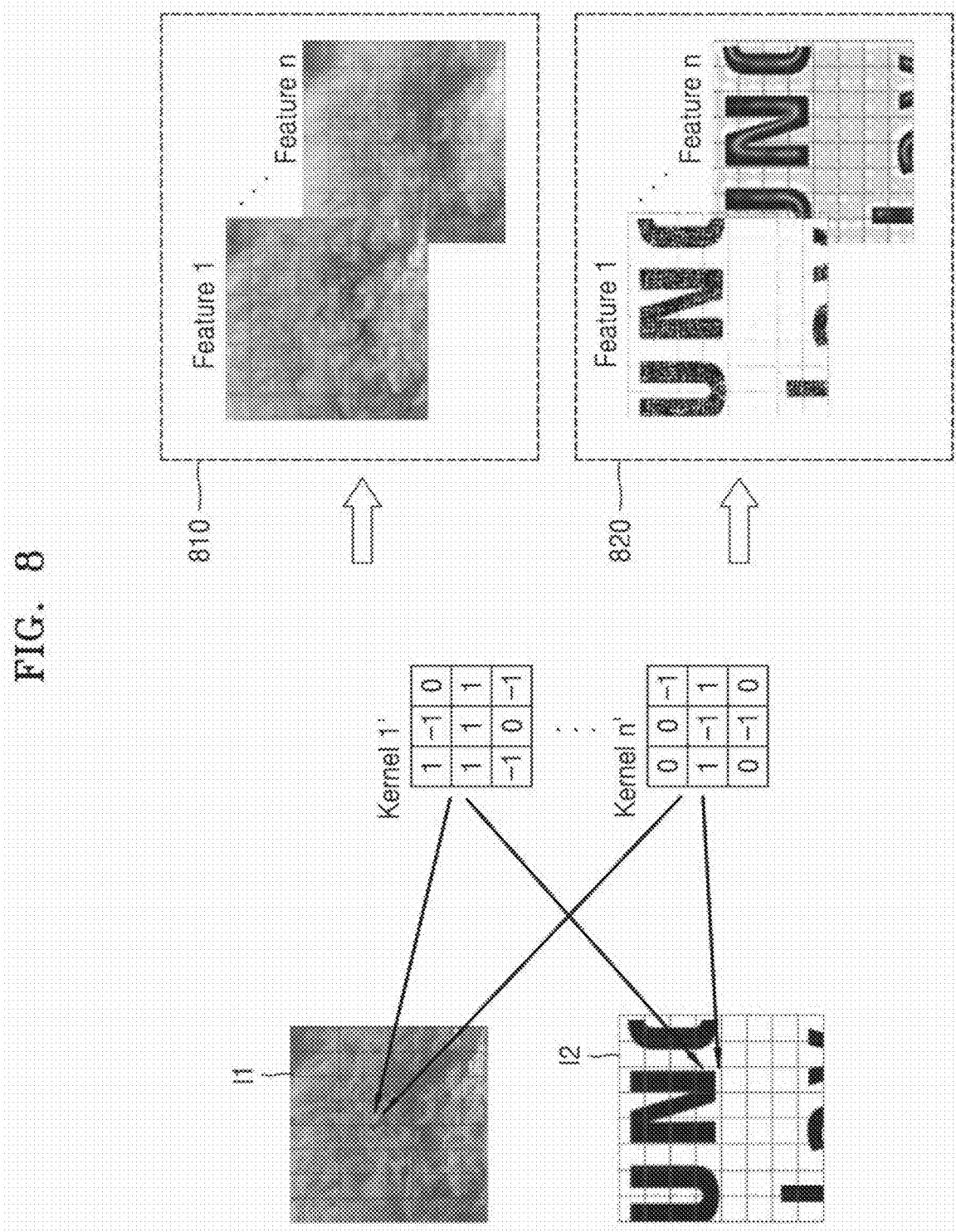
FIG. 8 illustrates input data and output data of a first convolution layer in the third deep neural network of FIG. 1.

FIG. 8 illustrates input data and output data of a first convolution layer in the DNN3 of FIG. 1.

Referring to FIG. 8, when the first input image I1 is input to the first convolution layer included in the DNN3 described with reference to FIG. 1, third feature maps 810 may be extracted. In addition, when the second input image I2 is input to the first convolution layer included in the DNN3, fourth feature maps 820 may be extracted.

When the first feature maps 710 of FIG. 7 are compared to the third feature maps 810 of FIG. 8, texture features included in the first input image I1 are better represented in the first feature maps 710 than the third feature maps 810. In addition, when the second feature maps 720 of FIG. 7 are compared to the fourth feature maps 820 of FIG. 8, text or edge features are better represented in the second feature maps 720 than the fourth feature maps 820.

Accordingly, the DNN 150 according to an embodiment may perform image processing on an input image according to a purpose indicated by a classifier.

Figure 9:
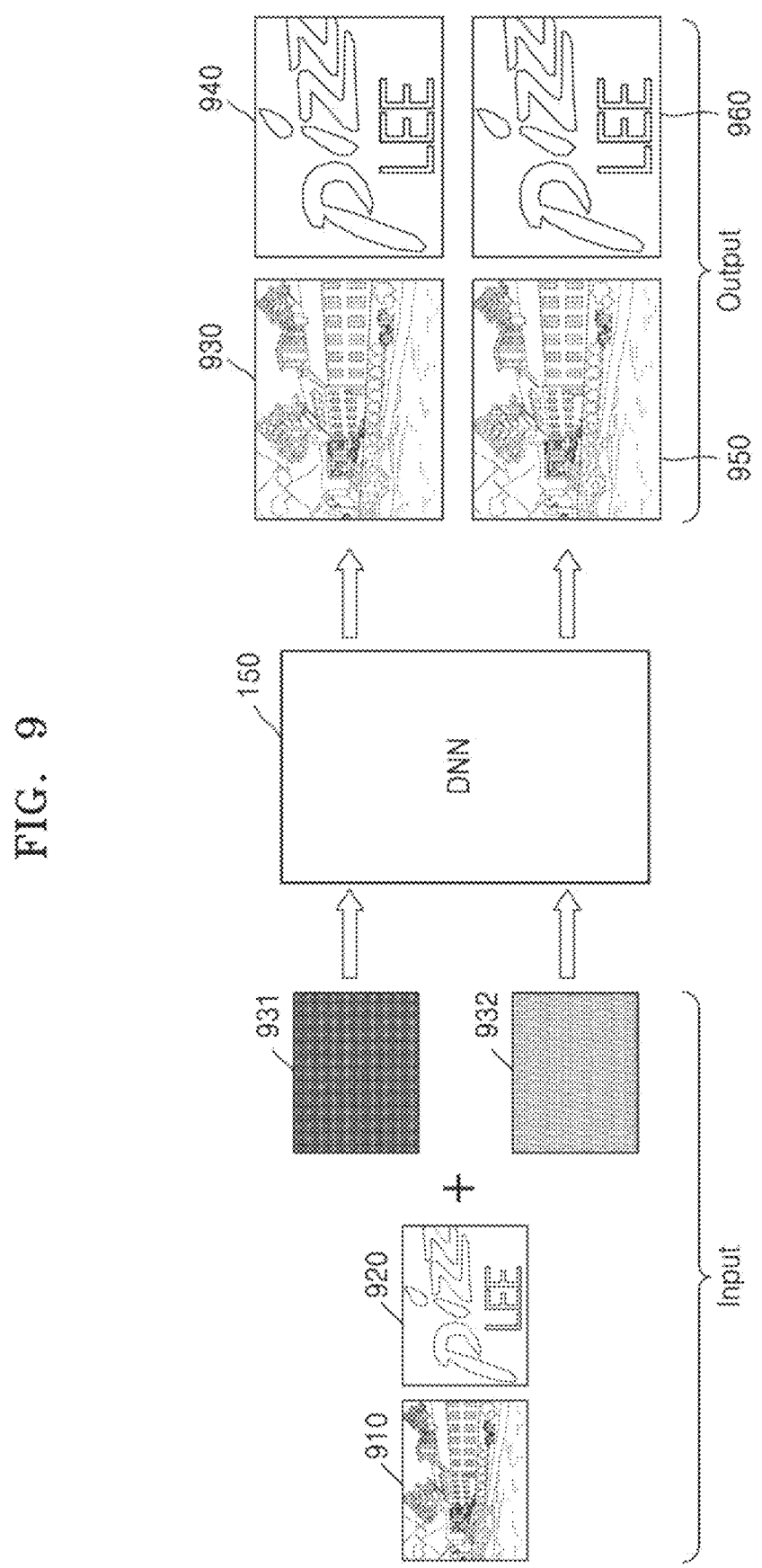
FIG. 9 illustrates input data and output data of a deep neural network, according to an embodiment.

FIG. 9 illustrates input data and output data of a DNN, according to an embodiment.

Referring to FIG. 9, when a first image 910 and a first classifier 931 are input to the DNN 150, a third image 930 is output, and when a second image 920 and the first classifier 931 are input to the DNN 150, a fourth image 940 is output. Herein, pixel values of the first classifier 931 may have the first value indicating detail enhancement (texture representation enhancement). When both an image to be processed and the first classifier 931 are input to the DNN 150, a purpose of image processing may be determined as detail enhancement by the first classifier 931.

The first image 910 is an image mainly including texture, and thus, the output third image 930 may be a high-resolution image obtained by enhancing a detail of the first image 910. However, the second image 920 is an image mainly including a texture or an edge, and thus, the output fourth image 940 may not exhibit an effect of text or edge enhancement.

When the first image 910 and a second classifier 932 are input to the DNN 150, a fifth image 950 is output, and when the second image 920 and the second classifier 932 are input to the DNN 150, a sixth image 960 is output. Herein, pixel values of the second classifier 932 may have the second value indicating text or edge enhancement. When both an image to be processed and the second classifier 932 are input to the DNN 150, a purpose of image processing may be determined as text or edge enhancement by the second classifier 932.

The second image 920 is an image mainly including a text or an edge, and thus, the output sixth image 960 may be a high-resolution image obtained by enhancing a text or an edge included in the second image 920. However, the first image 910 is an image mainly including texture, and thus, the output fifth image 950 may not exhibit an effect of texture enhancement.

Figure 10:
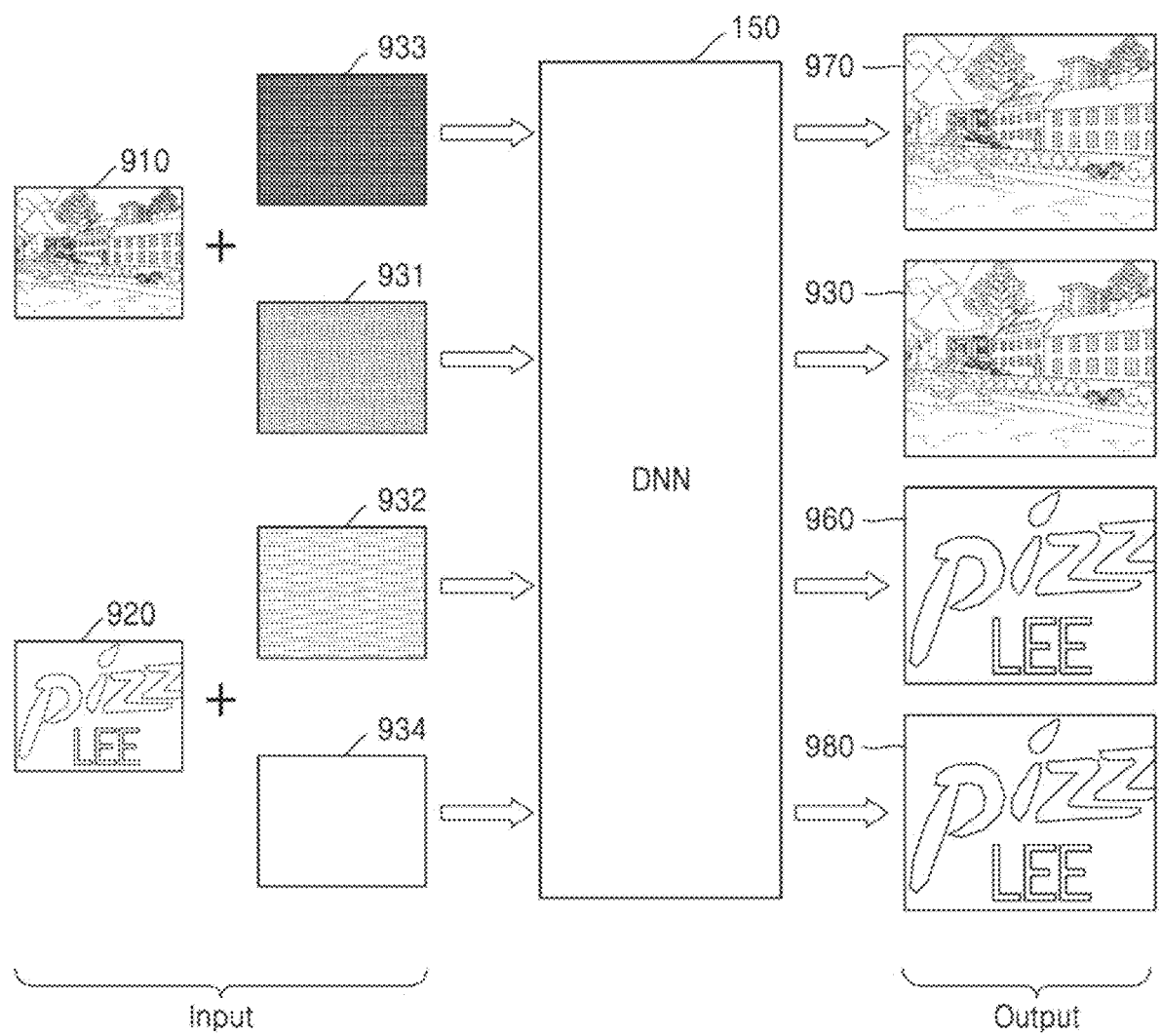
FIG. 10 illustrates input data and output data of a deep neural network, according to an embodiment.

FIG. 10 illustrates input data and output data of a DNN, according to an embodiment.

Referring to FIG. 10, when the first image 910 and a third classifier 933 are input to the DNN 150, a seventh image 970 may be output. Pixel values of the third classifier 933 may have a third value. Herein, the third value may be less than the first value when the first value indicating detail enhancement is less than the second value indicating text or edge enhancement. Alternatively, the third value may be greater than the first value when the first value is greater than the second value. The output seventh image 970 may exhibit a better detail enhancement effect than the detail enhancement effect exhibited in the third image 930 described with reference to FIG. 9.

In addition, when the second image 920 and a fourth classifier 934 are input to the DNN 150, an eighth image 980 may be output. Pixel values of the fourth classifier 934 may have a fourth value. Herein, the fourth value may be greater than the second value when the second value is greater than the first value. Alternatively, the fourth value may be less than the second value when the second value is less than the first value. In this case, the output eighth image 980 may exhibit a better text or edge enhancement effect than the text or edge enhancement effect exhibited in the sixth image 960 described with reference to FIG. 9.

Figure 11:
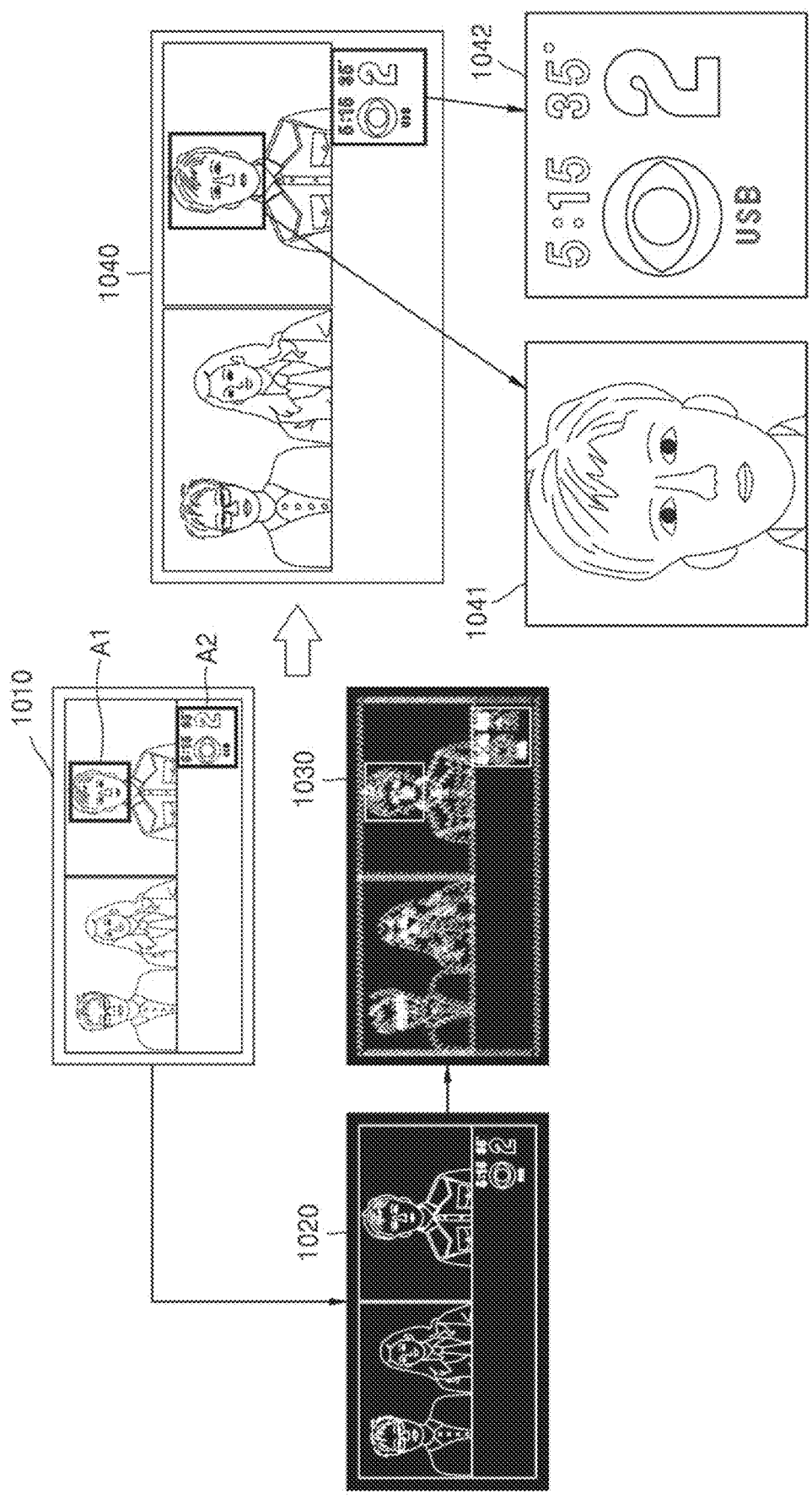
FIG. 11 is a reference diagram for describing a method of generating a classifier, according to an embodiment.

FIG. 11 is a reference diagram for describing a method of generating a classifier, according to an embodiment.

Referring to FIG. 11, the image processing device 100 according to an embodiment may generate a classifier 1030 based on a first image 1010 to be processed.

For example, the image processing device 100 may generate a map image 1020 indicating an edge and a text of the first image 1010 by extracting the edge and the text of the first image 1010. The image processing device 100 may extract the edge and the text of the first image 1010 by using various known edge extraction filters or text extraction filters.

In this case, in the map image 1020 indicating the edge and the text, pixel values in an edge and text region may be set to have the second value, and pixel values in the other region may be set to have the first value. However, the present embodiment is not limited thereto.

The image processing device 100 may generate the classifier 1030 by smoothing the map image 1020 indicating the edge and the text. Herein, the smoothing may be image processing for adjusting pixel values around an edge and a text so that the pixel values change smoothly.

Referring to FIG. 11, in the classifier 1030, a region corresponding to a first region A1 of the first image 1010, which is represented as texture, may include pixels mainly having the first value, and a region corresponding to a second region A2 of the first image 1010, which is represented as a text, may include pixels mainly having the second value.

In addition, the image processing device 100 may input the first image 1010 and the generated classifier 1030 to the DNN 150, so that an output image 1040 obtained by converting the first image 1010 into a high-resolution image is generated. Herein, in the output image 1040, a region 1041 corresponding to the first region A1 of the first image 1010, which is represented as texture, may exhibit an effect of detail enhancement (texture representation enhancement), and a region 1042 corresponding to the second region A2 of the first image 1010, which is represented as a text, may exhibit an effect of text enhancement.

Figure 12:
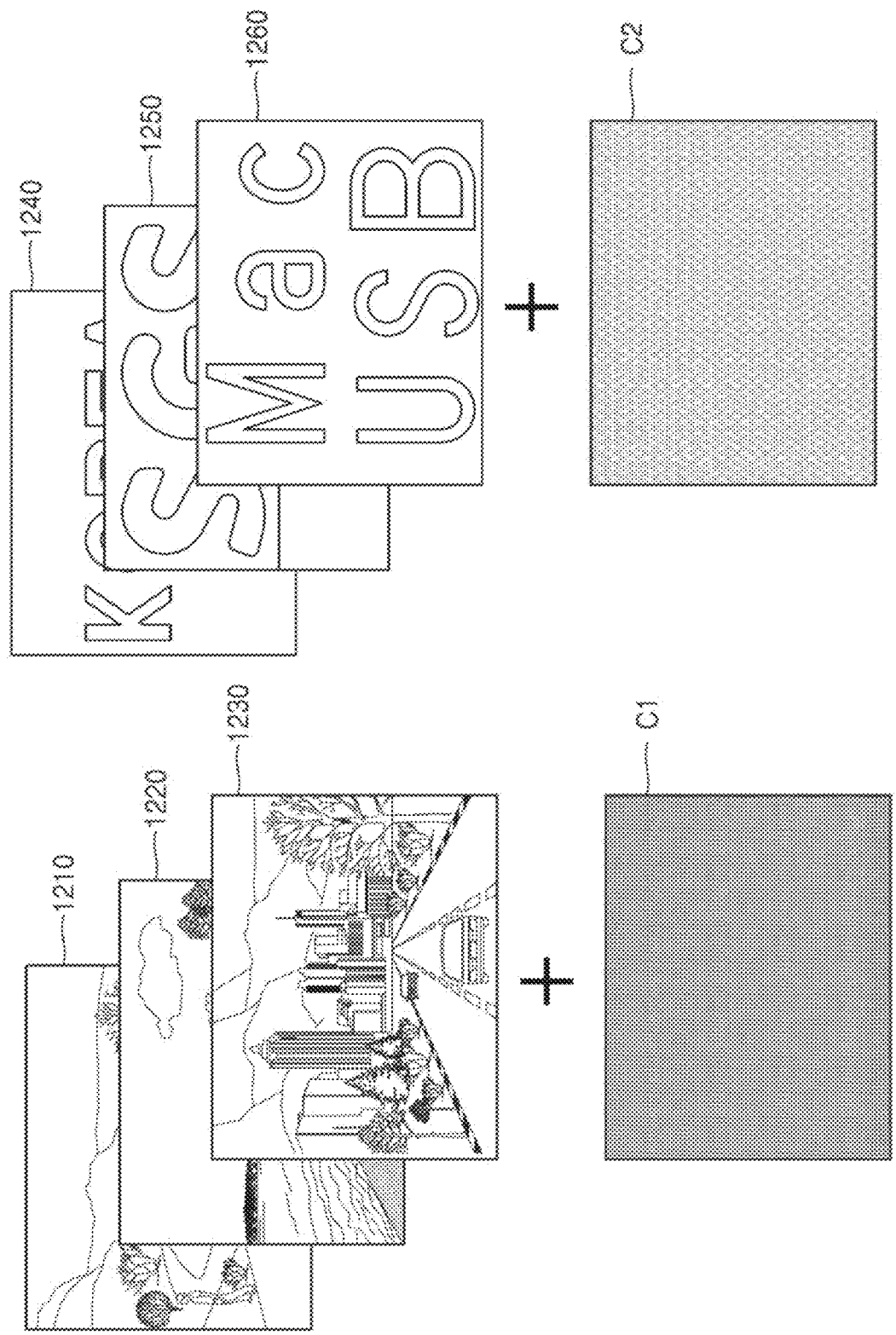
FIG. 12 illustrates identification images generated based on first images, according to an embodiment.

FIG. 12 illustrates identification images generated based on first images, according to an embodiment.

Referring to FIG. 12, the image processing device 100 may receive images to be processed. The received images may be classified into images mainly including texture representation and images mainly including text or edge representation. For example, first to third images 1210, 1220, and 1230 may be images mainly including texture representation, and fourth to sixth images 1240, 1250, and 1260 may be images mainly including text or edge representation.

When a received image is an image mainly including texture representation, the image processing device 100 may determine a pixel value of a classifier as the first value, and generate the first classifier C1 having the first value as every pixel values. In this case, the DNN 150 included in the image processing device 100 may be a network trained by inputting the first classifier C1 together with training data for texture representation enhancement when the network is trained with the training data.

Alternatively, when a received image is an image mainly including text or edge representation, the image processing device 100 may determine a pixel value of a classifier as the second value, and generate the second classifier C2 having the second value as every pixel values. In this case, the DNN 150 included in the image processing device 100 may be a network trained by inputting the second classifier C2 together with training data for text or edge representation enhancement when the network is trained with the training data.

Figure 13:
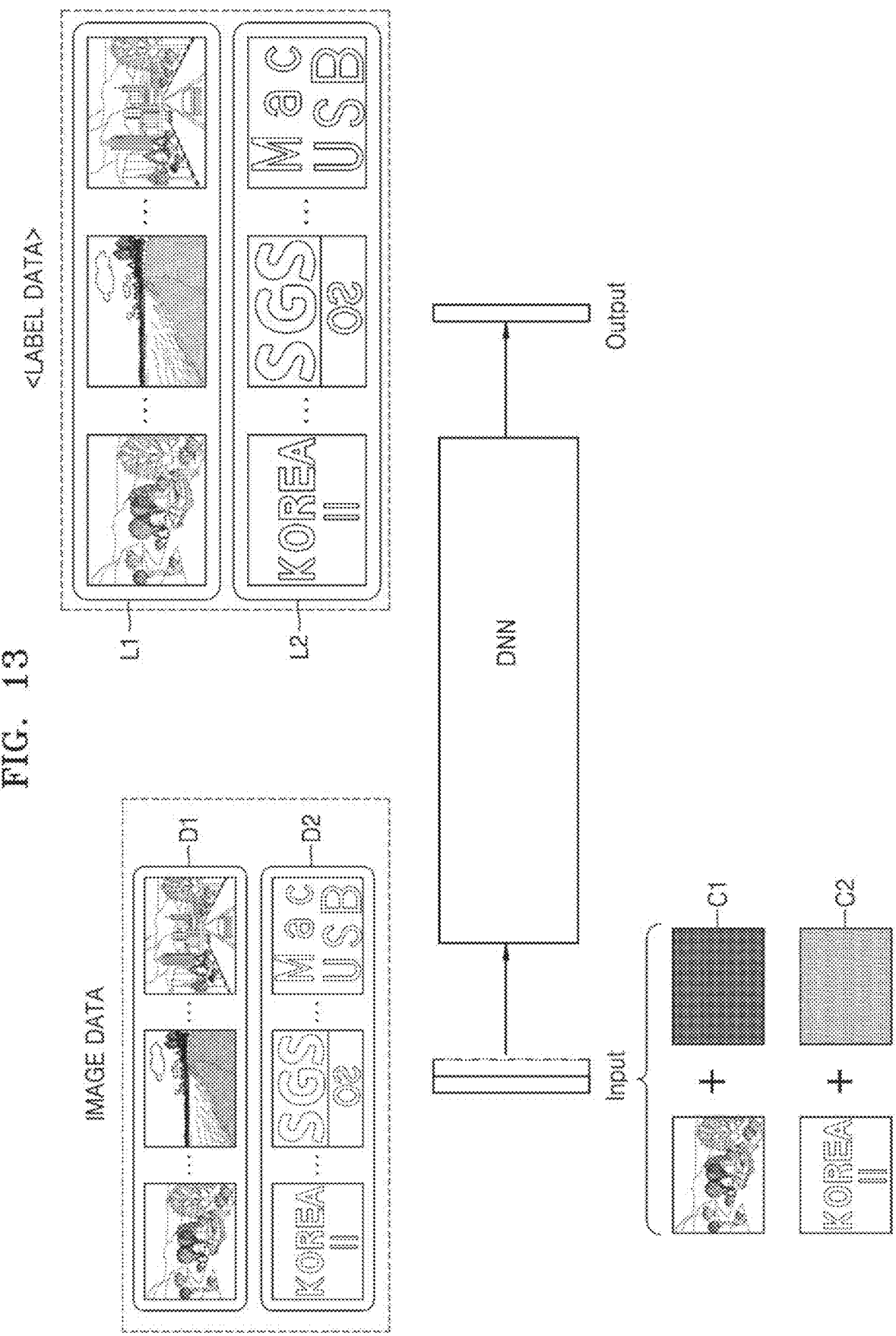
FIG. 13 is a reference diagram for describing a method of training a deep neural network, according to an embodiment.

FIG. 13 is a reference diagram for describing a method of training a DNN, according to an embodiment.

Referring to FIG. 13, the DNN 150 according to an embodiment may be trained by a plurality of training data sets having different purposes. For example, the training data sets may include a first training data set D1 and L1 for training of image processing according to the first purpose and a second training data set D2 and L2 for training of image processing according to the second purpose. Herein, the image processing according to the first purpose may include processing an input image so as to enhance a detail (texture representation) when the input image is converted into a high-resolution image. In addition, the image processing according to the second purpose may include processing an input image so as to enhance text or edge representation when the input image is converted into a high-resolution image. Although FIG. 13 shows an example of training according to two purposes, the present embodiment is not limited thereto.

The first training data set D1 and L1 may include the pieces of first image data D1 and the pieces of first label data L1. The pieces of first label data L1 may be, as pieces of image data obtained by converting the pieces of first image data D1 into high-resolution images, pieces of image data of which texture representation has been enhanced when the pieces of first image data D1 are converted into high-resolution images.

In addition, the second training data set D2 and L2 may include the pieces of second image data D2 and the pieces of second label data L2. The pieces of second label data L2 may be, as pieces of image data obtained by converting the pieces of second image data D2 into high-resolution images, pieces of image data obtained by reducing jagging or the like appearing around a text or an edge (enhancing text or edge representation) when the pieces of second image data D2 are converted into high-resolution images.

The image processing device 100 according to an embodiment may input the first classifier C1 together with the pieces of first image data D1 to the DNN 150 and input the second classifier C2 together with the pieces of second image data D2 to the DNN 150. Herein, a pixel value of the first classifier C1 and a pixel value of the second classifier C2 may be set by a user, and the first classifier C1 and the second classifier C2 may have single pixel values. In addition, the pixel value of the first classifier C1 is different from the pixel value of the second classifier C2.

The image processing device 100 may train the DNN 150 so that the pieces of first label data L1 respectively corresponding to the pieces of first image data D1 are output when the pieces of first image data D1 and the first classifier C1 are input. For example, the image processing device 100 may adjust weights of one or more kernels included in the DNN 150 so as to decrease differences between the pieces of first label data L1 and pieces of image data output when the pieces of first image data D1 and the first classifier C1 are input to the DNN 150.

In addition, the image processing device 100 may train the DNN 150 so that the pieces of second label data L2 respectively corresponding to the pieces of second image data D2 are output when the pieces of second image data D2 and the second classifier C2 are input. For example, the image processing device 100 may adjust weights of one or more kernels included in the DNN 150 so as to decrease differences between the pieces of second label data L2 and pieces of image data output when the pieces of second image data D2 and the second classifier C2 are input to the DNN 150.

Figure 14:
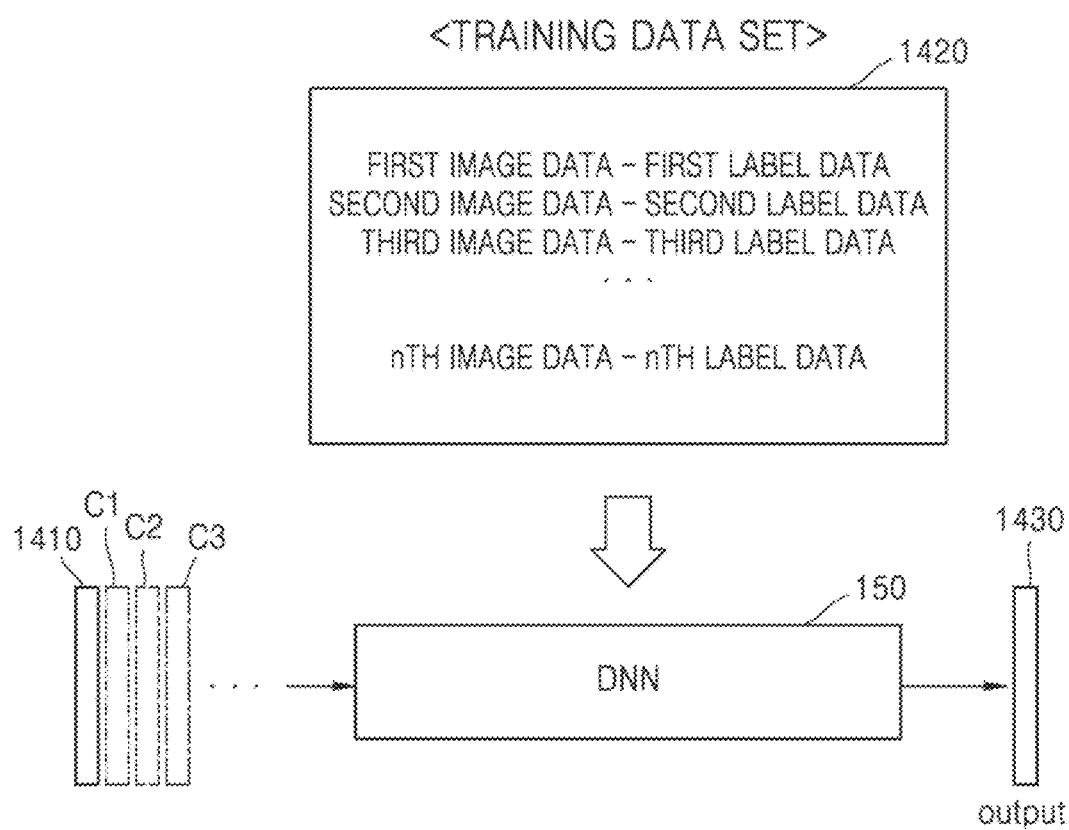
FIG. 14 is a reference diagram for describing a deep neural network configured to perform image processing according to a plurality of purposes, according to an embodiment.

FIG. 14 is a reference diagram for describing a DNN configured to perform image processing according to a plurality of purposes, according to an embodiment.

Referring to FIG. 14, the DNN 150 according to an embodiment may be trained by a training data set 1420. The training data set 1420 may include first to nth image data and first to nth label data respectively corresponding to the n pieces of image data. For example, the n pieces of label data may be, as pieces of image data obtained by respectively converting the n pieces of image data into high-resolution images, pieces of image data obtained by processing each of the n pieces of image data according to at least one of the first purpose (e.g., detail enhancement (texture representation enhancement)), the second purpose (e.g., noise reduction), and a third purpose (e.g., coding artifact reduction). However, the present embodiment is not limited thereto.

The DNN 150 may receive the first classifier C1, the second classifier C2, and a third classifier C3 (four channels) together with image data. Herein, the first classifier C1 may be an image indicating a degree of detail enhancement, the second classifier C2 may be an image indicating a degree of noise reduction, and the third classifier C3 may be an image indicating a degree of coding artifact reduction.

For example, pixel values of the first classifier C1, the second classifier C2, and the third classifier C3 input to the DNN 150 together with first image data 1410 may be determined based on the first image data 1410 and the first label data. By comparing the first image data 1410 to the first label data obtained by converting the first image data 1410 into a high-resolution image, the pixel value of the first classifier C1 may be determined according to a degree of detail enhancement exhibited in the first label data, the pixel value of the second classifier C2 may be determined according to a degree of noise reduction, and the pixel value of the third classifier C3 may be determined according to a degree of coding artifact reduction. The pixel value of the first classifier C1 may be less as the degree of detail enhancement increases.

For example, when the degree of detail enhancement exhibited in the first label data when the first image data 1410 is compared to the first label data is greater than a degree of detail enhancement exhibited in the second label data when the second image data is compared to the second label data, the pixel value of the first classifier C1 input together with the first image data 1410 may be less than a pixel value of the first classifier C1 input together with the second image data.

In addition, the pixel value of the second classifier C2 may be less as the degree of noise reduction increases, and the pixel value of the third classifier C3 may be less as the degree of coding artifact reduction increases. However, the present embodiment is not limited thereto, and pixel values of identification images may be determined by various methods.

In addition, the first to third classifiers C1, C2, and C3 input together with each of the n pieces of image data may be differently determined according to a degree of detail enhancement, a degree of noise reduction, and a degree of coding artifact reduction exhibited in the n pieces of label data.

In addition, the image processing device 100 may train the DNN 150 so that the first label data is output when the first image data 1410, the first classifier C1, the second classifier, C2, and the third classifier C3 are input. For example, the image processing device 100 may adjust weights of one or more kernels included in the DNN 150 so as to decrease a difference between the first label data and image data 1430 output when the first image data 1410, the first classifier C1, the second classifier, C2, and the third classifier C3 are input to the DNN 150.

When an input image is processed by using the DNN 150 trained in the same manner as described above, an image processing purpose of the input image and an image processing level according to the purpose may be determined by adjusting pixel values of the first to third classifiers C1, C2, and C3. For example, when a large degree of detail enhancement, a small degree of noise reduction, and a small degree of coding artifact reduction in an input image are desired, the pixel value of the first classifier C1 may be set as a small value, and the pixel values of the second and third classifiers C2 and C3 may be set as large values. However, the present embodiment is not limited thereto.

Figure 15:
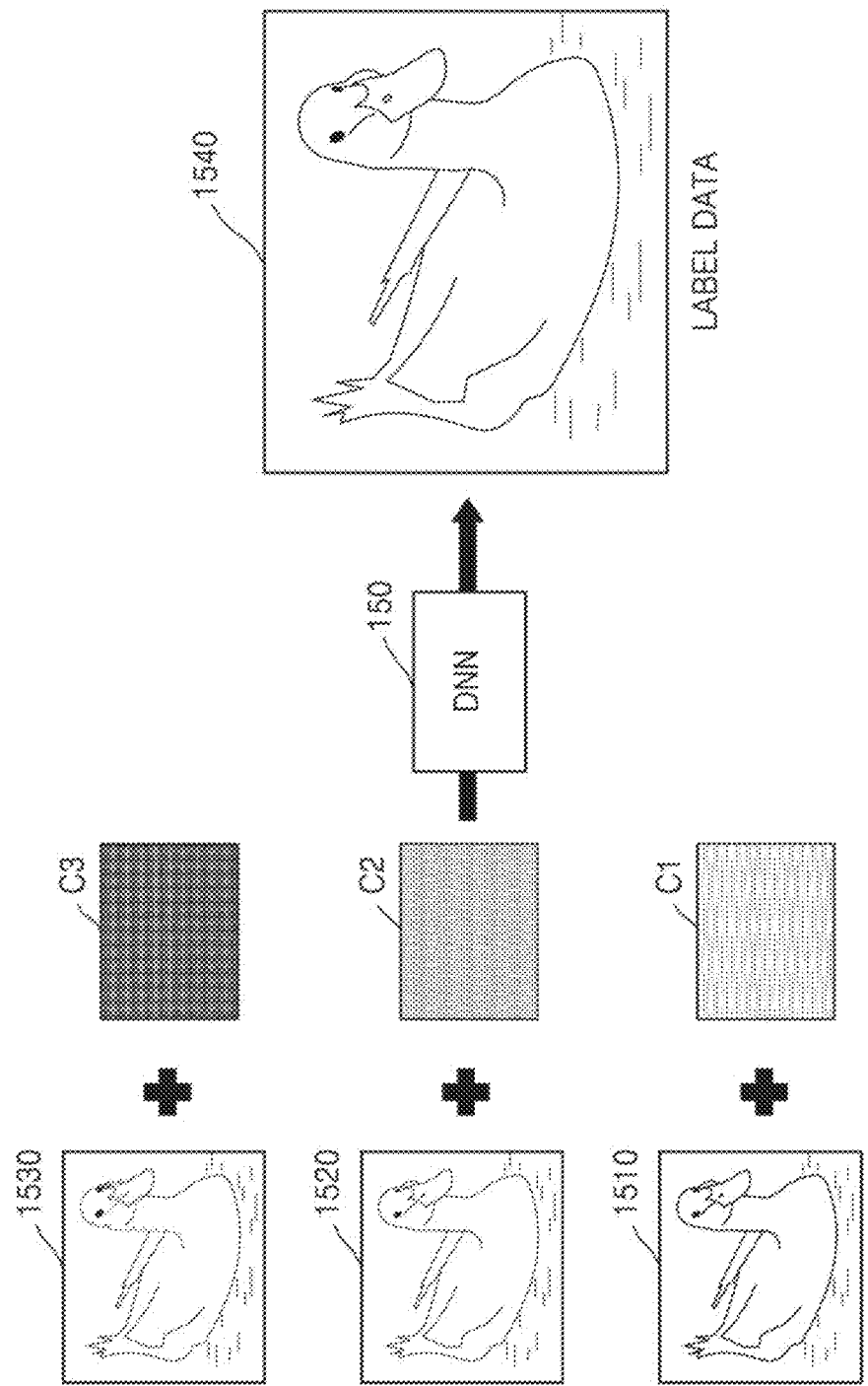
FIG. 15 is a reference diagram for describing a method of generating a training data set for training a deep neural network, according to an embodiment.

FIG. 15 is a reference diagram for describing a method of generating a training data set for training a DNN, according to an embodiment.

Referring to FIG. 15, the training data set may include a plurality of pieces of image data (e.g., first to third image data) 1510, 1520, and 1530 and one piece of label data 1540. Herein, the plurality of pieces of image data 1510, 1520, and 1530 may be generated using the label data 1540. For example, the image processing device 100 may generate the first image data 1510 by blurring the label data 1540 by a first strength, generate the second image data 1520 by blurring the label data 1540 by a second strength, and generate the third image data 1530 by blurring the label data 1540 by a third strength.

The image processing device 100 may input both each of the first to third image data 1510, 1520, and 1530 and a classifier that indicates a degree of detail enhancement to the DNN 150. Herein, a pixel value of the first classifier C1 input together with the first image data 1510 may be set to the first value. In addition, a pixel value of the second classifier C2 input together with the second image data 1520 may be set to the second value, and the second value may be less than the first value. In addition, a pixel value of the third classifier C3 input together with the third image data 1530 may be set to the third value, and the third value may be less than the second value. However, the present embodiment is not limited thereto.

The image processing device 100 may train the DNN 150 so as to decrease a difference between the label data 1540 and output data output in correspondence to each of the input first image data 1510, second image data 1520, and third image data 1530.

Although only a method of generating a training data set for detail enhancement has been described with reference to FIG. 15, a training data set for noise reduction or coding artifact reduction may also be generated in the same manner.

Figure 16:
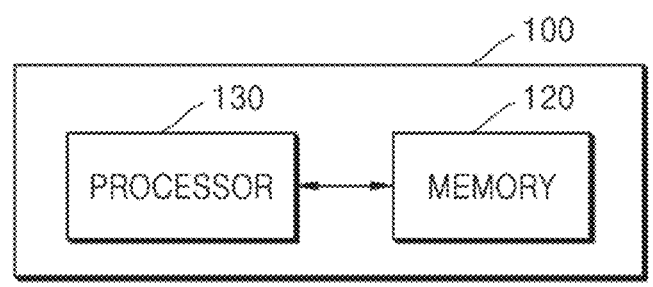
FIG. 16 is a block diagram of an image processing device according to an embodiment.

FIG. 16 is a block diagram of an image processing device according to an embodiment.

Referring to FIG. 16, the image processing device 100 according to an embodiment may include a processor 130 and a memory 120.

The processor 130 according to an embodiment may generally control the image processing device 100. The processor 130 according to an embodiment may execute one or more programs stored in the memory 120.

The memory 120 according to an embodiment may store various pieces of data, a program, or an application for operating and controlling the image processing device 100. The program stored in the memory 120 may include one or more instructions. The program (the one or more instructions) or the application stored in the memory 120 may be executed by the processor 130.

The processor 130 according to an embodiment may obtain a first image and a classifier that indicates a purpose of image processing and process, by using a DNN, the first image according to the purpose indicated by classifier. Herein, the DNN may be the DNN shown in and described with reference to FIGS. 2 to 15.

Alternatively, the processor 130 may generate an input image and a classifier to be input to the DNN, based on the first image. For example, the processor 130 may convert R, G, and B channels included in the first image into Y, U, and V channels through a color space conversion and determine an image of the Y channel among the Y, U, and V channels as the input image. The processor 130 may determine a pixel value of the classifier as the first value corresponding to the first purpose when attempting to perform image processing on the first image according to the first purpose and determine the pixel value of the classifier as the second value corresponding to the second purpose when attempting to perform image processing on the first image according to the second purpose. Alternatively, the processor 130 may extract an edge and a text from the first image and generate a classifier based on the extracted edge and text.

The DNN may include N convolution layers, and the processor 130 may extract feature information (a feature map) by performing a convolution operation in which one or more kernels are applied to the input image and an identification image in each of the N convolution layers, and process the first image according to a purpose indicated by the classifier, based on the extracted feature information.

The processor 130 may determine an image processing level according to the first purpose and an image processing level according to the second purpose based on a value of pixels included in the classifier, the first value corresponding to the first purpose, and the second value corresponding to the second purpose and process the first image according to the determined level.

The processor 130 may train the DNN by using a plurality of training data sets having different purposes. For example, the processor 130 may train the DNN by using a first training data set including pieces of first image data, a first classifier, and pieces of first label data obtained by processing the pieces of first image data according to the first purpose and a second training data set including pieces of second image data, a second classifier, and pieces of second label data obtained by processing the pieces of second image data according to the second purpose.

For example, the processor 130 may adjust weights of one or more kernels included in the DNN to decrease differences between the pieces of first label data and pieces of image data output when the pieces of first image data and the first classifier are input to the DNN. In addition, the processor 130 may adjust the weights of the one or more kernels included in the DNN to decrease differences between the pieces of second label data and pieces of image data output when the pieces of second image data and the second classifier are input to the DNN.

Figure 17:
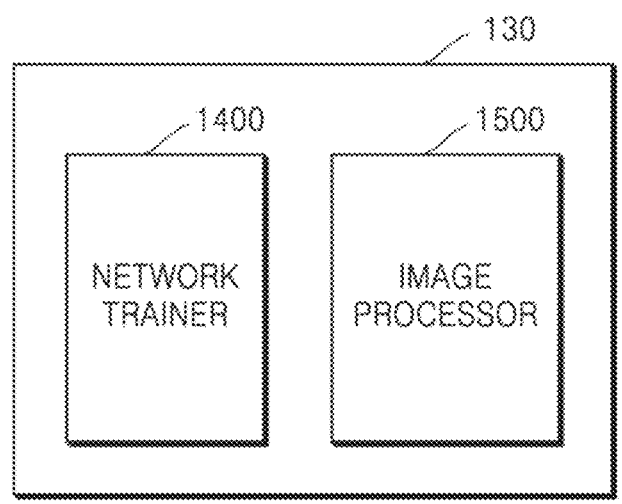
FIG. 17 is a block diagram of a processor according to an embodiment.

FIG. 17 is a block diagram of the processor 130 according to an embodiment.

Referring to FIG. 17, the processor 130 according to an embodiment may include a network trainer 1400 and an image processor 1500.

The network trainer 1400 may obtain training data for training a DNN according to an embodiment. The network trainer 1400 may obtain a plurality of training data sets having different purposes. For example, the training data sets may include a first training data set for training of image processing according to the first purpose and a second training data set for training of image processing according to the second purpose. Herein, the image processing according to the first purpose may include processing an input image so as to enhance a detail (texture representation) when the input image is converted into a high-resolution image. In addition, the image processing according to the second purpose may include processing an input image so as to enhance text or edge representation when the input image is converted into a high-resolution image. However, the present embodiment is not limited thereto.

Alternatively, the network trainer 1400 may generate training data for training the DNN. For example, a training data set may be generated by the method described with reference to FIG. 15.

The network trainer 1400 may learn a reference of how to process an input image, based on the plurality of training data sets having different purposes. Alternatively, the network trainer 1400 may learn a reference of which training data set is supposed to be used to process an input image. For example, the network trainer 1400 may train the DNN by the method described with reference to FIGS. 13 and 14, by using the plurality of training data sets.

The network trainer 1400 may store a trained network (e.g., the DNN) in a memory of an image processing device. Alternatively, the network trainer 1400 may store the trained network in a memory of a server connected to the image processing device over a wired or wireless network.

The memory in which the trained network is stored may also store, for example, a command or data associated with at least one other component of the image processing device 100. In addition, the memory may store software and/or a program. The program may include, for example, a kernel, middleware, an application programming interface (API), and/or an application program (or "application").

Alternatively, the network trainer 1400 may train the DNN based on a high-resolution image generated by the image processor 1500. For example, the DNN may be trained by using a training algorithm including error back-propagation or gradient descent, or the like.

The image processor 1500 may process a first image based on the first image and a classifier that indicates a purpose of image processing. For example, the image processor 1500 may process the first image according to the purpose indicated by the classifier, by using the trained DNN.

At least one of the network trainer 1400 and the image processor 1500 may be manufactured in a hardware chip form and mounted in an image processing device. For example, at least one of the network trainer 1400 and the image processor 1500 may be manufactured in a dedicated hardware chip form for artificial intelligence (AI) or manufactured as a portion of a conventional general-use processor (e.g., a central processing unit (CPU) or an application processor) or a graphics exclusive processor (e.g., a graphics processing unit (GPU)) and mounted in various kinds of image processing devices.

In this case, the network trainer 1400 and the image processor 1500 may be mounted in one image processing device or mounted in individual image processing devices, respectively. For example, a portion of the network trainer 1400 and the image processor 1500 may be included in the image processing device 100, and the remaining portion may be included in a server.

In addition, at least one of the network trainer 1400 and the image processor 1500 may be implemented by a software module. When at least one of the network trainer 1400 and the image processor 1500 is implemented by a software module (or a program module including an instruction), the software module may be stored in a non-transitory computer-readable recording medium. In addition, in this case, at least one software module may be provided by an operating system (OS) or a certain application. Alternatively, a portion of the at least one software module may be provided by the OS, and the remaining portion may be provided by the certain application.

Figure 18:
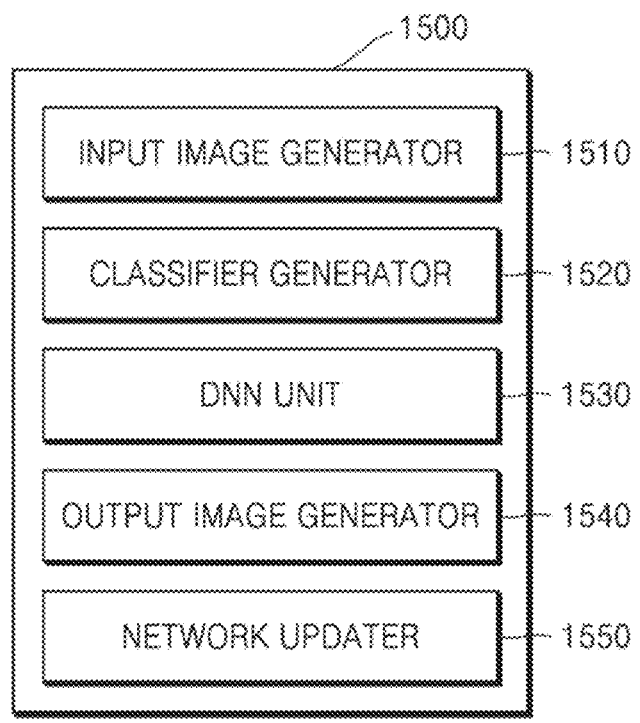
FIG. 18 is a block diagram of an image processor according to an embodiment.

FIG. 18 is a block diagram of the image processor 1500 according to an embodiment.

Referring to FIG. 18, the image processor 1500 may include an input image generator 1510, a classifier generator 1520, a DNN unit 1530, an output image generator 1540, and a network updater 1550.

The input image generator 1510 may receive a first image to be processed and generate, based on the first image, an input image to be input to a DNN. For example, the input image generator 1510 may convert R, G, and B channels included in the first image into Y, U, and V channels through a color space conversion and determine an image of the Y channel among the Y, U, and V channels as the input image. Alternatively, the input image generator 1510 may determine the R, G, and B channels included in the first image as the input image.

The classifier generator 1520 may generate a first classifier having, as a pixel value, the first value corresponding to the first purpose when attempting to perform image processing on the first image according to the first purpose and generate a second classifier having, as a pixel value, the second value corresponding to the second purpose when attempting to perform image processing on the first image according to the second purpose. The classifier generator 1520 may generate a classifier having a single pixel value or a classifier having different pixel values for respective regions.

The classifier generator 1520 may extract an edge and a text from the first image and generate a classifier based on the extracted edge and text. For example, the classifier generator 1520 may generate a map image indicating the edge and the text of the first image by extracting the edge and the text of the first image. In this case, the classifier generator 1520 may extract the edge and the text of the first image by using various known edge extraction filters or text extraction filters. In addition, the classifier generator 1520 may generate a classifier by smoothing the map image indicating the edge and the text.

The DNN unit 1530 according to an embodiment may perform image processing on the first image by using a DNN trained by the network trainer 1400. For example, the input image generated by the input image generator 1510 and the classifier generated by the classifier generator 1520 may be input as input data of the DNN. The DNN according to an embodiment may extract feature information by performing a convolution operation in which one or more kernels are applied to the input image and the classifier. The DNN unit

1530 may process the first image according to a purpose indicated by the classifier, based on the extracted feature information.

The output image generator 1540 may generate a final image (a second image) based on data output from the DNN. For example, the output image generator 1540 may upscale images of the U and V channels of the first image and generate the final image by concatenating the upscaled images and an image (the image of the Y channel of the first image) processed by and output from the DNN. Herein, the final image may be an image obtained by processing the first image according to the purpose indicated by the classifier.

The network updater 1550 may update the DNN based on an evaluation about the output image provided from the DNN unit 1530 or the final image provided from the output image generator 1540. For example, the network updater 1550 may allow the network trainer 1400 to update the DNN, by providing image data provided from the DNN unit 1530 or the output image generator 1540 to the network trainer 1400.

At least one of the input image generator 1510, the classifier generator 1520, the DNN unit 1530, the output image generator 1540, and the network updater 1550 may be manufactured in a hardware chip form and mounted in an image processing device. For example, at least one of the input image generator 1510, the classifier generator 1520, the DNN unit 1530, the output image generator 1540, and the network updater 1550 may be manufactured in a dedicated hardware chip form for AI or manufactured as a portion of a conventional general-use processor (e.g., a CPU or an application processor) or a graphics exclusive processor (e.g., a GPU) and mounted in various kinds of image processing devices.

In this case, the input image generator 1510, the classifier generator 1520, the DNN unit 1530, the output image generator 1540, and the network updater 1550 may be mounted in one image processing device or mounted in individual image processing devices, respectively. For example, some of the input image generator 1510, the classifier generator 1520, the DNN unit 1530, the output image generator 1540, and the network updater 1550 may be included in an image processing device, and the other some may be included in a server.

In addition, at least one of the input image generator 1510, the classifier generator 1520, the DNN unit 1530, the output image generator 1540, and the network updater 1550 may be implemented by a software module. When at least one of the input image generator 1510, the classifier generator 1520, the DNN unit 1530, the output image generator 1540, and the network updater 1550 is implemented by a software module (or a program module including an instruction), the software module may be stored in a non-transitory computer-readable recording medium. In addition, in this case, at least one software module may be provided by an OS or a certain application. Alternatively, a portion of the at least one software module may be provided by the OS, and the remaining portion may be provided by the certain application.

The block diagrams of the image processing device 100, the processor 130, and the image processor 1500 shown in FIGS. 16 to 18 are only for an embodiment. Each component in the block diagrams may be integrated, added, or omitted according to a specification of the image processing device 100. That is, in accordance with circumstances, two or more components may be integrated into one component, or one component may be divided into two or more components. In addition, a function performed by each block is to describe embodiments, and a particular operation or device thereof does not limit the right scope of the present invention.

An operating method of an image processing device, according to an embodiment, may be implemented in a form of program commands executable by various computer means and recorded on a computer-readable recording medium. The computer-readable recording medium may include program commands, data files, data structures, and the like, taken alone or in combination. The program commands recorded on the medium may be specially designed and constructed for the present invention or may be known to and usable by one of ordinary skill in a field of computer software. Examples of the computer-readable recording medium include magnetic media, e.g., hard discs, floppy discs, or magnetic tapes, optical media, e.g., compact disc-read only memories (CD-ROMs), or digital versatile discs (DVDs), magneto-optical media, e.g., floptical discs, and hardware devices that are specially configured to store and carry out program commands, e.g., ROMs, RAMs, or flash memories. Examples of the program commands include a high-level language code that may be executed by a computer using an interpreter as well as a machine language code made by a complier.

In addition, an image processing device for generating a high-resolution video and an operating method of the image processing device, according to the embodiments, may be provided by being included in a computer program product. The computer program product may be traded as a product between a seller and a purchaser.

The computer program product may include a software (S/W) program, and a computer-readable storage medium in which the S/W program is stored. For example, the computer program product may include a S/W program form of product (e.g., a downloadable application) electronically distributed through a manufacturing company of the electronic device or an electronic market (e.g., Google PlayStore, or App Store). For the electronic distribution, at least a portion of the S/W program may be stored in a storage medium or temporarily generated. In this case, the storage medium may be included in a server of the manufacturing company, a server of the electronic market, or a relay server configured to temporarily store the S/W program.

The computer program product may include a storage medium of a server or a storage medium of a client device in a system including the server and the client device. Alternatively, when a third device (e.g., a smartphone) connected to the server or the client device through communication exists, the computer program product may include a storage medium of the third device. Alternatively, the computer program product may include the S/W program to be transmitted from the server to the client device or the third device or transmitted from the third device to the client device.

In this case, one of the server, the client device, and the third device may execute the computer program product and perform the methods according to the embodiments. Alternatively, two or more of the server, the client device, and the third device may execute the computer program product and perform the methods according to the embodiments in a distributed fashion.

For example, a server (e.g., a cloud server or an AI server) may execute a computer program product stored in the server to control a client device connected to the server through communication, wherein the client device performs the methods according to the disclosed embodiments.

While the embodiments have been described in detail, the right scope of the present invention is not limited thereto, and various modified and improved forms of those of ordinary skill in the art using the basis concept of the present invention defined in the claims also belong to the right scope of the disclosure.

The invention claimed is:

1. An image processing device comprising:
a memory storing one or more instructions; and
a processor configured to execute the one or more instructions stored in the memory,
wherein the processor is further configured to obtain a first image and a classifier that indicates a purpose of image processing, and to process, by using a deep neural network (DNN), the first image according to the purpose indicated by the classifier,
wherein the DNN processes input images according to different purposes, and
wherein pixels included in the classifier have at least one of a first value and a second value that is greater than the first value, the first value indicates a first purpose, and the second value indicates a second purpose.

2. The image processing device of claim 1, wherein the DNN comprises N convolution layers, and
the processor is further configured to generate an input image based on the first image, extract feature information by performing a convolution operation in which one or more kernels are applied to the input image and the classifier in the N convolution layers, and generate a second image based on the extracted feature information.

3. The image processing device of claim 2, wherein the processor is further configured to convert R, G, and B channels included in the first image into Y, U, and V channels of a YUV mode and determine, as the input image, an image of the Y channel among the Y, U, and V channels.

4. The image processing device of claim 3, wherein the processor is further configured to generate the second image based on an image output by processing the image of the Y channel in the DNN and on images of the U and V channels among the Y, U, and V channels.

5. The image processing device of claim 1, wherein the processor is further configured to process the first image according to the first purpose when all the pixels included in the classifier have the first value and to process the first image according to the second purpose when all the pixels included in the classifier have the second value.

6. The image processing device of claim 1, wherein, when pixels in a first region included in the classifier have the first value, and pixels in a second region included in the classifier have the second value, a third region corresponding to the first region in the first image is processed according to the first purpose, and a fourth region corresponding to the second region in the first image is processed according to the second purpose.

7. The image processing device of claim 1, wherein the processor is further configured to process the first image according to a level of image processing according to the first purpose and a level of image processing according to the second purpose, which are determined based on values of the pixels included in the classifier, the first value, and the second value.

8. The image processing device of claim 1, wherein the processor is further configured to generate the classifier based on a characteristic of the first image.

9. The image processing device of claim 8, wherein the processor is further configured to generate a map image indicating text and an edge included in the first image and determine a value of pixels included in the classifier based on the map image.

10. The image processing device of claim 1, wherein the DNN is trained by a first training data set including first image data, a first classifier having the first value as a pixel value, and first label data obtained by processing the first image data according to the first purpose, and by a second training data set including second image data, a second classifier having the second value as a pixel value, and second label data obtained by processing the second image data according to the second purpose.

11. The image processing device of claim 10, wherein the processor is further configured to adjust weights of one or more kernels included in the DNN to decrease a difference between the first label data and image data output when the first image data and the first classifier are input to the DNN, and adjust the weights of the one or more kernels included in the DNN to decrease a difference between the second label data and image data output when the second image data and the second classifier are input to the DNN.

12. An operating method of an image processing device, the method comprising:
obtaining a first image and a classifier that indicates a purpose of image processing; and
processing the first image according to the purpose indicated by the classifier, by using a deep neural network (DNN),
wherein the DNN processes a plurality of images according to different purposes, and
wherein pixels included in the classifier have at least one of a first value and a second value that is greater than the first value, the first value indicates a first purpose, and the second value indicates a second purpose.

13. The method of claim 12, wherein the obtaining of the first image and the classifier comprises generating an input image based on the first image,
the DNN comprises N convolution layers, and
the processing of the first image according to the purpose indicated by the classifier, by using the DNN, comprises:
extracting feature information by performing a convolution operation in which one or more kernels are applied to the input image and the classifier in the N convolution layers; and
generating a second image based on the extracted feature information.

14. The method of claim 13, wherein the generating of the input image based on the first image comprises:
converting R, G, and B channels included in the first image into Y, U, and V channels of a YUV mode; and
determining, as the input image, an image of the Y channel among the Y, U, and V channels.

* * * * *